United States Patent [19]
Engstrom et al.

[11] Patent Number: 6,044,408
[45] Date of Patent: Mar. 28, 2000

[54] MULTIMEDIA DEVICE INTERFACE FOR RETRIEVING AND EXPLOITING SOFTWARE AND HARDWARE CAPABILITIES

[75] Inventors: G. Eric Engstrom; Craig G. Eisler, both of Kirkland, Wash.

[73] Assignee: Microsoft Corporation, Redmond, Wash.

[21] Appl. No.: 08/641,017

[22] Filed: Apr. 25, 1996

[51] Int. Cl.$^7$ .................................................. G06F 13/10
[52] U.S. Cl. ............................................................ 709/302
[58] Field of Search .................................... 395/681, 682, 395/500, 527, 500.01 T; 709/301, 302; 345/501–506, 519–522, 526

[56] References Cited

U.S. PATENT DOCUMENTS

| | | | |
|---|---|---|---|
| 4,835,532 | 5/1989 | Fant | 345/136 |
| 5,140,687 | 8/1992 | Dye et al. | 395/500 |
| 5,249,266 | 9/1993 | Dye et al. | 395/162 |
| 5,390,138 | 2/1995 | Milne et al. | 381/119 |
| 5,394,523 | 2/1995 | Harris | 345/501 |
| 5,455,599 | 10/1995 | Cabral et al. | 345/133 |
| 5,634,070 | 5/1997 | Robinson | 395/800 |
| 5,748,468 | 5/1998 | Notenboom et al. | 364/132 |
| 5,796,984 | 1/1996 | Pearce et al. | 395/500 |

OTHER PUBLICATIONS

Implementing Games for Windows Using the WinG API and the WaveMix DLL, James Finnegan, Microsoft Systems Journal, pp. 61–81, Jan., 1995.

*Primary Examiner*—Alvin E. Oberley
*Assistant Examiner*—St. John Courtenay, III
*Attorney, Agent, or Firm*—Klarquist Sparkman Campbell Leigh & Whinston LLP

[57] ABSTRACT

In a multimedia API, a method for returning hardware and software capabilities. Multimedia APIs for media devices such as a display device, a sound device and a 3D accelerator each include a function to return the hardware and software capabilities of a particular media device. The hardware capabilities refer to capabilities of a media device such as a display controller, sound device or 3D graphics accelerator, while the software capabilities refer to capabilities of an emulation layer used to emulate functions of a media device. In processing API requests, the multimedia API optimizes the performance of the request by identifying the requested capabilities and determining whether these capabilities are available hardware capabilities. If so, the API instructs the media device to perform the function and passes it the relevant parameters for the request. If not, the API tries to emulate the requested capabilities using the emulation layer.

13 Claims, 5 Drawing Sheets

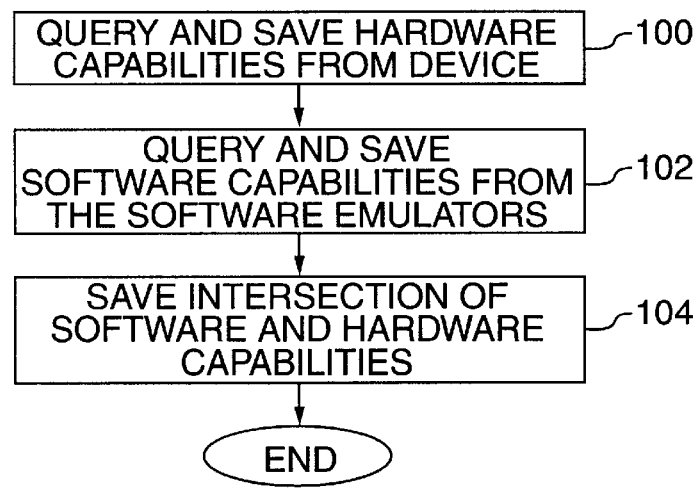
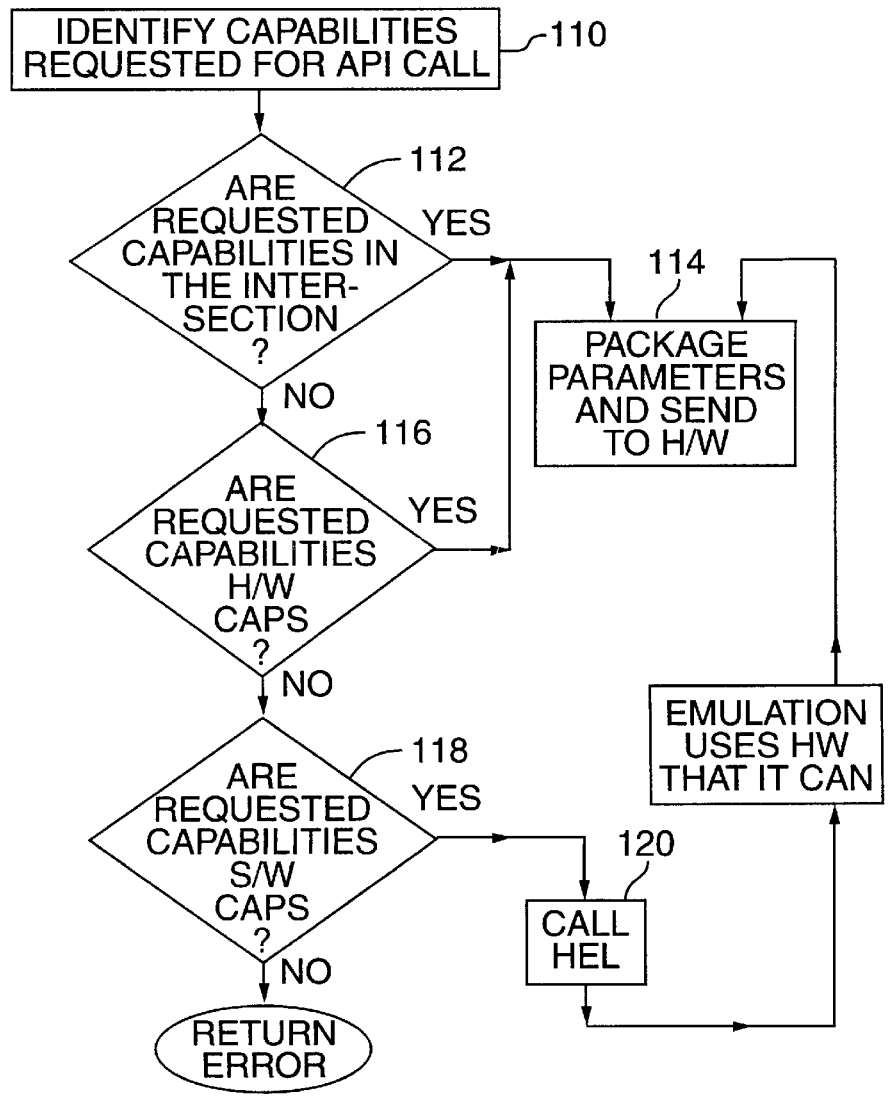

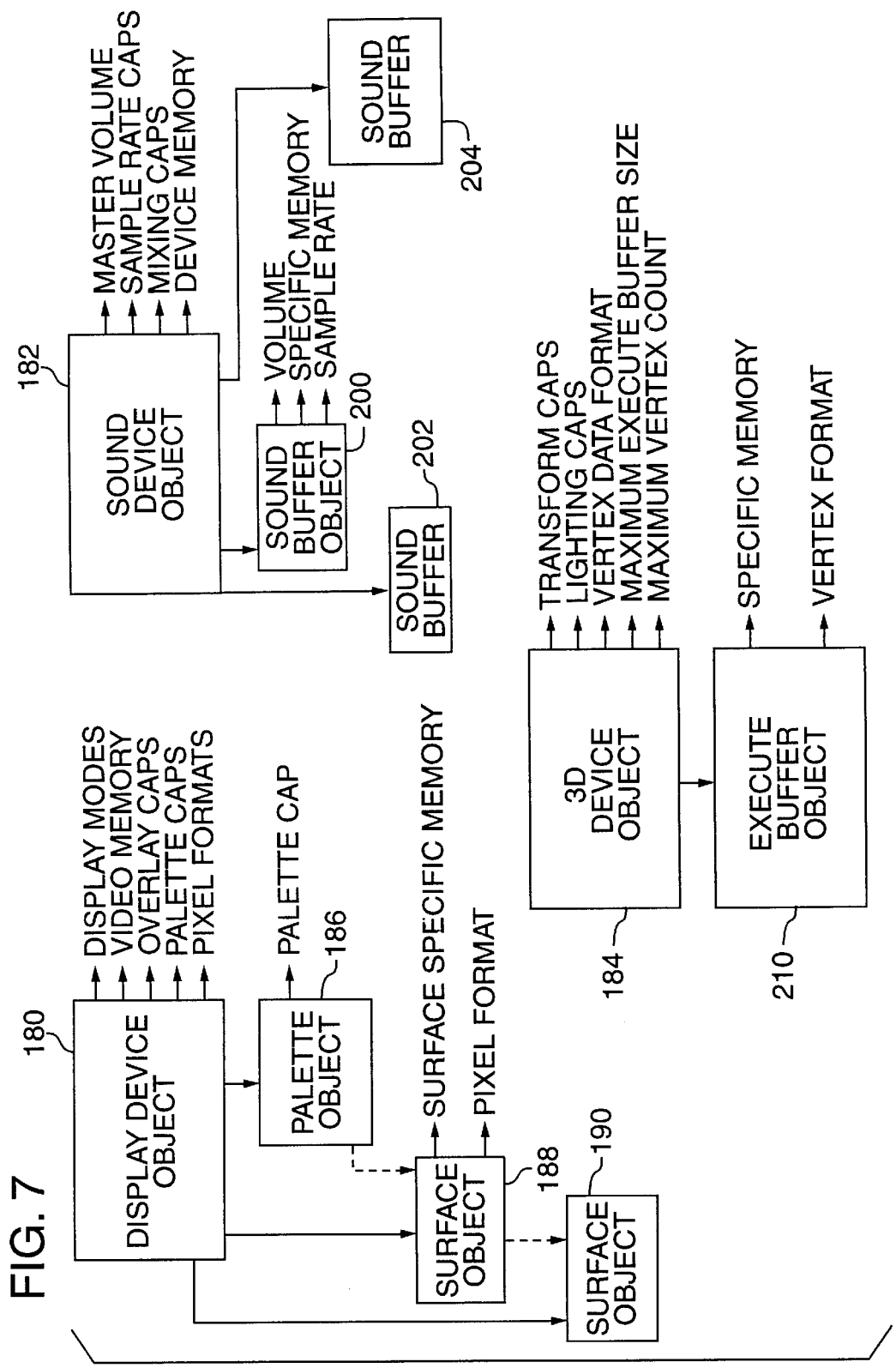

6,044,408

MULTIMEDIA DEVICE INTERFACE FOR RETRIEVING AND EXPLOITING SOFTWARE AND HARDWARE CAPABILITIES

This application is related to the following co-pending U.S. patent applications, which are commonly assigned:

Resource Management For Multimedia Devices In A Computer by Craig G. Eisler and G. Eric Engstrom, filed on Apr. 25, 1996 as application Ser. No. 08/637, 483;

Method And System For Flipping Images In A Window Using Overlays by G. Eric Engstrom and Craig G. Eisler, filed on Apr. 25, 1996 as application Ser. No. 08/639,333, now issued as U.S. Pat. No. 5,850,232 on Dec. 15, 1998;

Method And System In Display Device Interface For Managing Surface Memory by G. Eric Engstrom and Craig G. Eisler, filed on Apr. 25, 1996 as application Ser. No. 08/641,717, now issued as U.S. Pat. No. 5,801,717 on Sep. 1, 1998;

Display Device Interface Including Support For Generalized Flipping Of Surfaces by Craig G. Eisler and G. Eric Engstrom, filed on Apr. 25, 1996 as application Ser. No. 08/641,014, now issued as U.S. Pat. No. 5,844,559 on Dec. 1, 1998;

Method And System For Managing Color Specification Using Attachable Palettes And Palettes That Refer To Other Palettes by Craig G. Eisler and G. Eric Engstrom, filed on Apr. 25, 1996 as application Ser. No. 08/641, 016; and System For Enhancing Device Drivers by Craig G. Eisler and G. Eric Engstrom, filed on Apr. 25, 1996 as application Ser. No. 08/637,530.

These applications and patents are hereby incorporated by reference in their entirety.

TECHNICAL FIELD

The invention relates to software application programming interfaces (APIs) for multimedia devices in computer systems such as display controllers (video cards), sound devices, and three dimensional graphics accelerators. More specifically, it relates to support in a multimedia (API) for querying capabilities of multimedia devices and software emulators in a computer, and for exploiting these capabilities.

BACKGROUND OF THE INVENTION

When creating an application program for a computer such as a PC, the design of the user interface is a major concern to the application developer. In developing the user interface, the programmer typically has to include code to capture input from the user and provide output using the computer's peripherals. The interaction between an application and peripheral devices can vary significantly depending on the type of application and sophistication of the user interface. In a spreadsheet program, for example, the application needs to be informed when the user has updated a cell in a spreadsheet so that it can update the spreadsheet and display the proper result. Since the display changes rather infrequently and does not contain complex graphics in this example, the performance of the underlying software and hardware that controls the user interface is less critical. As such, the programmer can rely on a high level interface to graphics and input devices without being particularly concerned with the performance of the interface. The user interfaces of many of today's multimedia applications, however, are significantly more complex and have rigorous performance requirements. In multimedia games for example, the interaction between the application and peripherals is critical to achieving a highly interactive and realistic user interface. The interaction between the application can include not only reading input from a joystick and displaying images, but can also include mixing audio files to generate sound effects, rendering three dimensional animation using a graphics accelerator, decompressing and playing video, and updating the display image fast enough to depict realistic scenes.

To control a peripheral devices in this manner, the application program can attempt to control the peripheral devices directly or can perform operations through a software interface. A software interface provides access to certain services through a specified set of operations which can be invoked to request the services. For instance, an interface to sound effect services might include operations to "prepare a sound for playing," "start playing a sound," and "wait until a sound has finished playing." In response to a request for a particular service, the interface attempts to provide the service by taking steps to control the underlying hardware. In effect, the interface does what the application would have to do if it were to try to control the hardware directly. In addition to communicating with the hardware, an interface sometimes provides some resource management so that programs running in the computer can share access to the limited hardware resources.

For the vast majority of applications, application programmers rely on some form of software interface to interact with the computer's peripherals. Programmers typically rely on software interfaces to the peripherals so that they can focus on the specifics of their application rather than on the specifics of controlling a particular device. Unfortunately, many of today's software interfaces cannot provide the level of performance that multimedia applications demand.

There are a number of software products on the market today that provide interfaces between application programs and peripheral devices. These interfaces are sometimes characterized as low or high level interfaces, and device independent or dependent. A high level interface is one whose operations request big-picture strategic services, such as "start playing this sound" or "display this document." A low level interface is one whose operations request tactical services specifically, such as "tell the sound card at I/O (input/output) address 220 to point its DMA buffer to memory address 1000000" or "tell the video card to copy the 64×64 pixel region from a location starting at address 0000001 to a location starting at 1000000 in video memory". In general a high level interface may be easier for a programmer to use, but a low level interface may provide better performance and functionality. Ease of use comes from having fewer details to take care of, while better performance comes from taking advantage of special cases the hardware handles well. Hiding details tends to disguise special cases as well.

The terms "device independent" and "device dependent" refer to the extent to which the interface is specific to a particular piece of hardware. Device independent interfaces provide operations that are not specific to a particular brand of hardware device. Instead, the operations hide the detail of the hardware from the application and take care of these details internally. In contrast, device dependent interfaces provide operations to control specific features of a particular piece of hardware. To write an application using a device dependent interface, the application developer has to have a detailed understanding of how the specific hardware operates.

Hardware dependence is usually not favored because it is not flexible to changes in the underlying hardware and can often lead to resource contention problems. Programs written for a device dependent interface can be rendered obsolete by updates to the underlying hardware, and commonly do not work for more than one brand of peripheral. In addition, device dependent interfaces are more susceptible to resource contention problems because an application has access to its state information and can render it inoperable for other applications.

In general, high level interfaces tend to be device independent because they hide details, whereas low level interfaces tend to be device dependent because they reveal details. For instance, "play a sound" does not rely on the details of any sound card, but "tell the sound card at I/O address 220 . . . " obviously does.

While device independent, high level interfaces are generally easier to use for the reasons explained above, they typically are unable to provide the performance and functionality needed for certain types of applications. High level interfaces are often not sufficient for game applications and other multimedia applications because they are often incapable of achieving the desired performance. Games demand higher performance because they must achieve a high degree of user interactivity and visual realism. A game application typically has to collect rapidly changing user input, compute its impact on the current scene, and display the corresponding images and playback sounds with imperceptible delay.

Because they are designed for specific tasks, peripherals are usually much better at performing certain types of functions than the host processor. For example, a video card may have special purpose hardware that can copy pixels much faster than the CPU. A high level interface may not take advantage of this particular feature or may include additional layers of code that consume valuable CPU cycles and time before the operation is even started on the peripheral.

Since many peripherals have their own computing resources, such as processors and memory, performance can be improved by off-loading some tasks to the peripheral rather than consuming the resources of the host CPU. However, without a low level interface to expose these resources to the application, they are not fully exploited.

One drawback of many APIs available today is that they lack the ability to effectively expose multimedia hardware and software capabilities to the application programs. Many media interfaces provide no access to the specific capabilities of the media devices in the computer such as a display controller or sound device. As such, applications are unable to determine the capabilities of the media hardware, and optimize their behavior based on the available resources.

SUMMARY OF THE INVENTION

The invention provides methods for returning software and hardware capabilities in a multimedia API. The invention further provides methods for optimizing API function calls using available software and hardware capabilities. Software capabilities refer generally to software emulators associated with a particular media device such as a display device, a 3D graphics accelerator, or a sound device. Hardware capabilities refer to the capabilities of the actual media device.

One aspect of the invention relates to the support in a multimedia API for returning hardware and software capabilities. The multimedia API maintains the hardware and software capabilities in capabilities structures associated with a particular media device. As an optimization, the multimedia API can also maintain the intersection of the software and hardware capabilities.

Applications can request either hardware or software capabilities for a media device by invoking a function to get the capabilities for specified media device and specifying whether software, hardware or both capabilities are to be returned. In response, the function returns the requested capabilities. In one implementation, an application requests hardware capabilities by specifying a pointer to a capabilities structure to be filled with the hardware capabilities. Similarly, to get software emulator capabilities, the application specifies a pointer to a structure to be filled with the software capabilities. With knowledge of these capabilities, an application can optimize its behavior using available hardware capabilities to enhance performance.

The API includes a number of functions to access media types rendered by the respective media devices. For example, the display device API includes functions to access and manipulate surface memory holding a pixmap to be drawn on a display device, and palettes to be used to specify the entries in the display device's color table. These functions can be optimized by the API by identifying the available hardware or software capabilities needed to process a particular API request, and using the available hardware capabilities where possible to process the call.

Further features and advantages of the invention will become apparent with reference to the following detailed description and accompanying drawings.

BRIEF DESCRIPTION OF THE DRAWINGS

FIG. 3 is a flow diagram illustrating a method for getting hardware and software capabilities.

FIG. 4 is a flow diagram illustrating a method for optimizing an API call based on available hardware and software capabilities.

FIG. 7 is a diagram illustrating the relationship between media device objects and related objects in one implementation of multimedia APIs.

DETAILED DESCRIPTION

Figure 1:
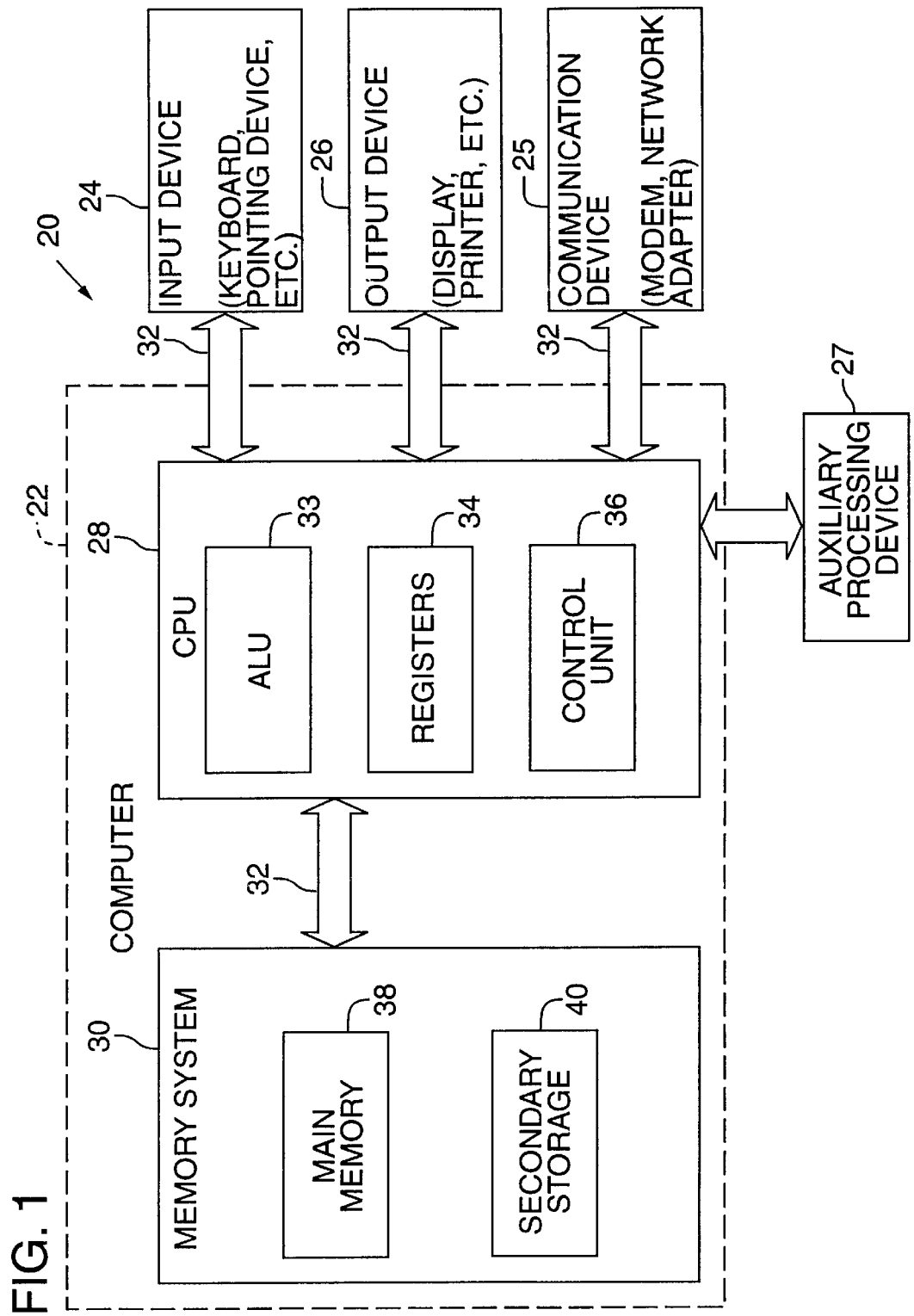
FIG. 1 is a general block diagram of a computer system in which an embodiment of the invention can be implemented.

FIG. 1 is a general block diagram of a computer system 20 in which an embodiment of the invention can be implemented. The computer system 20 includes as its basic elements a computer 22, one or more input devices 24 and one or more output device 26. The computer system can also include a communication device 25 and an auxiliary processing device 27.

Computer 22 generally includes a central processing unit (CPU) 28 and a memory system 30 that communicate through a bus structure 32. CPU 28 includes an arithmetic logic unit (ALU) 33 for performing computations, registers 34 for temporary storage of data and instructions and a control unit 36 for controlling the operation of computer system 20 in response to instructions from a computer program such as an application or an operating system.

Memory system 30 generally includes high-speed main memory 38 in the form of a medium such as random access memory (RAM) and read only memory (ROM) semiconductor devices, and secondary storage 40 in the form of a medium such as floppy disks, hard disks, tape, CD-ROM, etc. or other devices that use optical, magnetic or other recording material. Main memory 38 stores programs such as a computer's operating system and currently running application programs. In some implementations, portions of main memory 38 may also be used for displaying images through a display device.

Input device 24 and output device 26 are typically peripheral devices connected by bus structure 32 to computer 22. Input device 24 may be a keyboard, pointing device, pen, joystick, head tracking device or other device for providing input data to the computer.

Output device 26 may be a display device, printer, sound device or other device for providing output data from the computer.

The communication device 25 can include any of a variety of peripheral devices that enable computers to communicate. For example, the communication device can include a modem or a network adapter (25).

The auxiliary processing device 27 refers generally to a peripheral with a processor for enhancing the performance of the computer. One example of an auxiliary processing device is a graphics accelerator card.

It should be understood that FIG. 1 is a block diagram illustrating the basic elements of a computer system; the figure is not intended to illustrate a specific architecture for a computer system 20. For example, no particular bus structure is shown because various bus structures known in the field of computer design may be used to interconnect the elements of the computer system in a number of ways, as desired. CPU 28 may be comprised of a discrete ALU 33, registers 34 and control unit 36 or may be a single device in which one or more of these parts of the CPU are integrated together, such as in a microprocessor. Moreover, the number and arrangement of the elements of the computer system may be varied from what is shown and described in ways known in the art.

The invention may be implemented in any of a number of well-known computer systems. For instance, the invention may be implemented in a personal computer (PC), such as IBM-AT compatible computers or computer systems based on the 80386, 80486, or Pentium processors from Intel Corporation. Alternatively, the invention may be implemented on any number of computer workstations, such as machines based on a RISC (reduced instruction set computing) architecture. The above systems serve as examples only and should not be construed as limiting the type of computer system in which the invention may be implemented.

Figure 2:
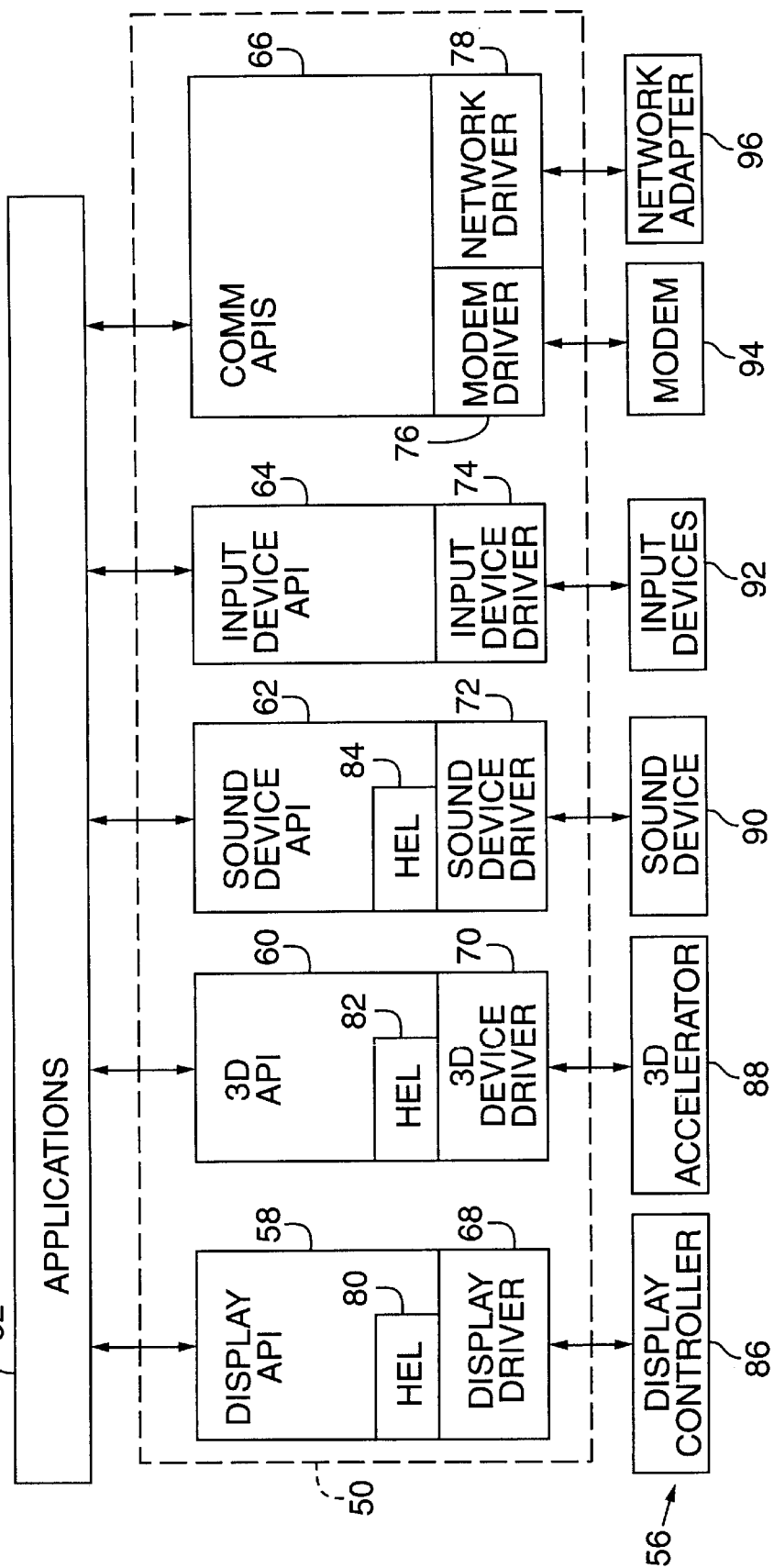
FIG. 2 is a block diagram illustrating the architecture of multimedia device interfaces in which one embodiment of the invention is implemented.

FIG. 2 is a block diagram illustrating the architecture of multimedia device interfaces 50 in which an embodiment of the invention is implemented. This diagram illustrates relationships between application programs ("applications") 52, multimedia device interfaces 50, and multimedia device hardware 56. In FIG. 2, there are five multimedia (APIs) including a display device API 58, a 3D graphics rendering (3D) API 60, a sound device API 62, an input API 64 and a communication (COMM) device API 66. Each of the APIs can communicate with the underlying multimedia hardware through device drivers 68–78. The device drivers are device dependent software interfaces used to carry out API functions on specific hardware devices 56. While FIG. 2 illustrates the device drivers 68–78 as separate software components, they can be integrated into the respective hardware devices as well.

FIG. 2 represents the multimedia devices (56) as separate functional components of the architecture. This does not mean that multimedia devices are always implemented as separate devices connected to the host PC. Multimedia devices can be implemented in separate cards that plug into a peripheral bus of a PC, implemented on a single card, or implemented on a chip or chips within the host computer, or on an external bus. In general, the APIs can operate in a number of different hardware platforms.

In the architecture shown in FIG. 2, the display device, 3D, and sound device APIs 58–62 include software emulators or Hardware Emulation Layers (HEL) 80–84. The APIs can invoke a software emulator to carry out an API request such as "copy a block of pixels," "render a stream of primitives based on rendering instructions," or "mix the following four sound files." Software emulation is particularly useful to provide additional functionality not supported in the underlying hardware device. However, as explained further below, a software emulator function can be invoked even in cases where the underlying hardware also supports the function. The APIs can inform the applications of the available capabilities so they can optimize their performance. In addition, the API can attempt to optimize a particular API request using available hardware and software capabilities.

The display device API shown in FIG. 2 provides services relating to the display of 2D images on a display monitor. It communicates with a display controller 86 through a display driver 68.

The 3D device API provides services relating to 3D graphics rendering including transforms, lighting, and rasterizing. The 3D API includes services to perform the steps in the rendering pipeline (transformation, lighting, and rasterization) either in software, or with the 3D accelerator 88. Like the display device API, the 3D also includes a HEL 82 for emulating hardware capabilities not available in the 3D accelerator. The API communicates with the 3D accelerator, if one is present, through the 3D device driver 70.

The sound device API provides services relating to the playback of sounds on a sound device 90. It communicates with the sound device through the sound device driver 72. The sound API includes a HEL 84 capable of emulating sound functions using the host CPU rather than the sound device.

The input device API provides access to digital or analog input devices 92 such as joysticks, touch screens, digitizing tablets, light pens, rudder pedals, flight yokes, virtual-reality headgear, etc. The API communicates with the input devices through device drivers 74.

Finally, the comm APIs provides access to communication services. The comm APIs access communication devices such as a modem or network adapter through a modem driver 76 or network driver 78, respectively. In one implementation of the APIs, the comm API refers to an application interface to support multimedia applications such as games that involve interaction with another computer. For example, in a multi-player game application, two players may be playing a game on separate computers that communicate through a local area network, through a modem connection, or across the Internet. The comm API provides access to the communication protocols necessary to establish communication paths between or among each computer involved in the game.

To invoke a multimedia related operation such as play sound, render a scene or copy a block of pixels, the applications invoke functions in the APIs. In response, the APIs instruct the hardware to carry out the operation, or invoke a software emulator to carry out the function.

In the architecture shown in FIG. 2, the display, 3D, and sound APIs include a service that returns the hardware and software capabilities for the respective media type. The hardware capabilities refer to the attributes and functionality of the underlying hardware, while the software capabilities refer to the functions of the software emulators. This service enables applications to scale to the available functionality. By providing the hardware and software capabilities, an application can choose to exploit a certain function if available in the hardware, and avoid using the function if only provided in software. Also, an application can choose to use its own software emulation if a particular hardware function is not available.

To take advantage of this service, an application can invoke it at initialization to get the available capabilities. The application can then optimize itself based on the available capabilities. If the application does not invoke the service, but instead attempts to use a capability that is not available, the API will tell the application that the capability is not available by returning an error parameter.

The APIs can also optimize a particular API request even in cases where the application has not done so. To optimize an API request, the API breaks down the request into the individual capabilities needed to process the request. It then determines whether the capabilities for the request are available hardware capabilities. If so, it instructs the hardware to carry out the request and passes in the necessary parameters.

If the necessary hardware capabilities are not available to handle the API request, the API determines whether the capabilities for the request are available software capabilities. If so, the API handles the request using the available emulators. Otherwise, the API tells the application that the API request cannot be processed by returning an error in most cases.

In some circumstances, the API can process an API request using a combination of software support in the API and available hardware capabilities. For example, in the case of the sound device API, the API may use the CPU to emulate sound mixing capabilities for some sounds. In the display device API, the API can break a bit block transfer (blt) request into a series of blt requests for the hardware blt capability in the display controller. In one implementation of the 3D API, the graphics rendering pipeline comprises three stages: 1) transform primitives; 2) set the lighting; and 3) rasterize primitives. Each of these stages can either be performed using software capabilities or hardware capabilities. Thus, in response to an API request to render a stream of graphics primitives, the 3D API can render the primitives using software rendering for one stage and hardware for another stage.

Having provided an overview of the APIs, we now turn to the API service for returning hardware and software capabilities. FIG. 3 is a flow diagram illustrating how a multimedia API retrieves software and hardware capabilities in one implementation. The process illustrated in FIG. 3 is typically performed at initialization to determine available hardware and software capabilities before beginning normal execution of a multimedia application.

The process shown in FIG. 3 applies to a number of media devices including the display controller, 3D accelerator and sound device. Therefore, we are not specific to the media in this diagram. More specific examples pertaining to specific media types are provided below and in Appendix A, which is incorporated by reference.

As shown in FIG. 3, the multimedia API queries and saves the hardware capabilities and the software capabilities (100, 102). In one specific implementation, the multimedia API fills one capabilities structure with the capabilities from the hardware device, and another structure with the capabilities from the software emulators. The device driver provides the hardware capabilities while the HEL (FIG. 2) provides the software capabilities in response to a request for the hardware and software capabilities.

As an optimization, the API also finds and stores the intersection between the hardware and software capabilities to determine which functions are available in both the hardware and the software (104). This optimizes how the capabilities are used to process an API request because it simplifies the API's decision whether the hardware device or a software emulator will be used to process the request.

Knowing the hardware and software capabilities returned by the API, applications can optimize their performance based on the available resources. An application can request the API to return capabilities at initialization before tries to use a particular hardware or software resource. In addition, an application can request capabilities during normal operation to determine how to use a given resource at that time. As the application executes, the availability of both the hardware and software resources may change. Thus, an application can operate more effectively if it asks the API to return capabilities before attempting to use a given resource. This is especially true in a multitasking environment such as the Window 95 Operating System from Microsoft where the availability or resources can change frequently as other applications request them.

The API can also optimize its performance of specific API requests. For example, the display device API can determine whether to use hardware or software capabilities in response to a blt request. Transparent (alpha) blting or Z (depth) blting may be supported in both hardware and software in a given system. In response to an API call for an alpha or z blt, the API can then decide whether to execute the API call using a software or hardware blter based on the available capabilities.

As another example, the sound device API can decide whether to use hardware or software capabilities to mix sound files. For instance, the API can accelerate a wave mixing function by using the underlying hardware to perform it. The API can also decide how to allocate memory for secondary mixing buffers. If the mixing buffers on the sound device are unavailable, the API can then decide to create the secondary mixing buffers in main memory of the CPU.

FIG. 4 is a flow diagram illustrating how a media API determines how to process an API request in one implementation. In response to API request (such as blt a pixel block, mix sounds in sound buffers, render the 3D graphics scene described in an execute buffer), the API identifies the requested capabilities for the request. As an optimization, the API determines whether the requested capabilities are in the intersection of available hardware and software capabilities, which it obtained as shown in FIG. 3. If the capabilities are in the intersection, then there is no need to perform further checking. The API then packages the parameters needed to process the request and instructs the hardware device to perform it (114). In this particular implementation, therefore, the API chooses the hardware over the software capabilities when both are available.

If the requested capabilities are not in the intersection, the API next determines whether they are available in the hardware (116). If so, the API proceeds to package the parameters and instruct the hardware to perform the request.

Finally, if the request cannot be performed in the hardware, the API determines whether the HEL has the requested capabilities (118). If so, the API invokes the function or functions in the HEL to process the API request.

Figure 5:
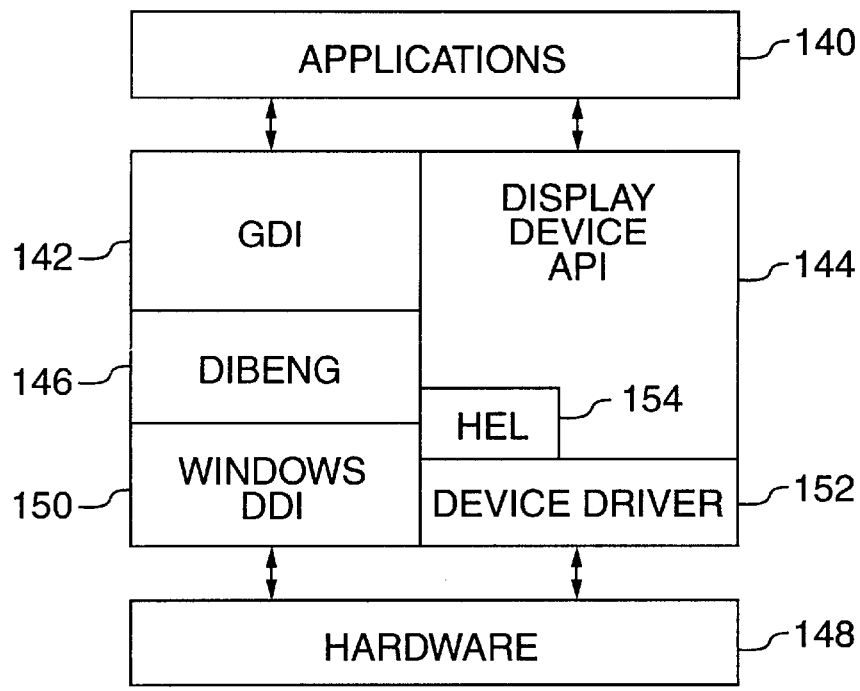
FIG. 5 is a block diagram illustrating one implementation of a display device interface architecture.
Figure 6:
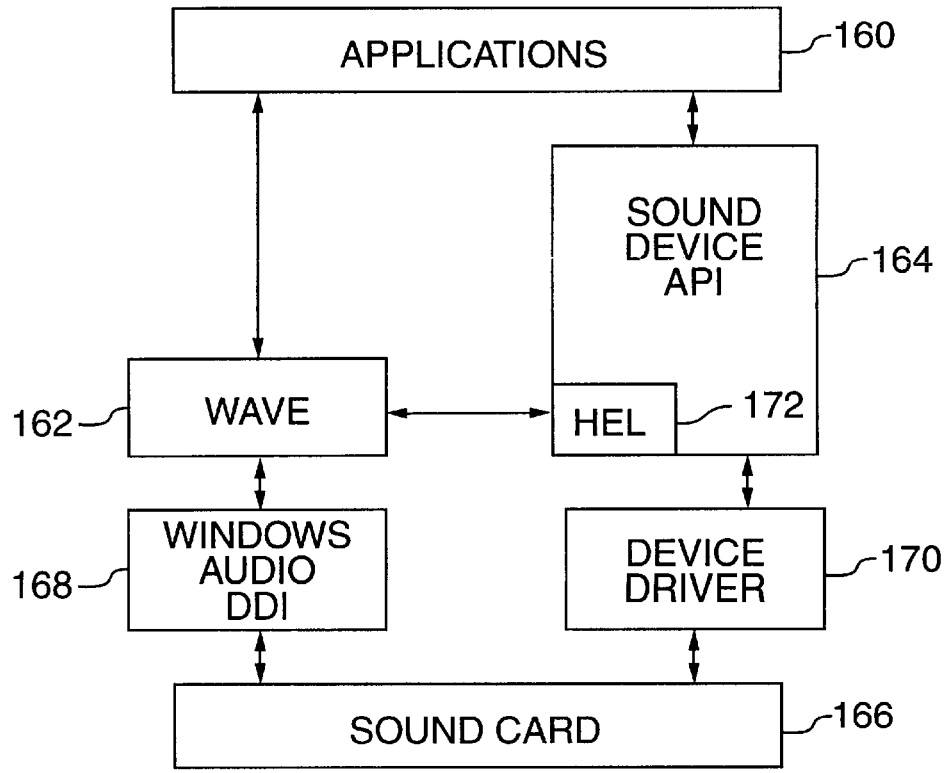
FIG. 6 is a block diagram illustrating one implementation of a sound device interface architecture.

FIGS. 5 and 6 illustrate examples of how multimedia APIs in FIG. 2 can be implemented in the Window 95 Operating System from Microsoft, Corp. FIG. 5 illustrates an example of the display architecture while FIG. 6 illustrates an example of the sound device architecture.

In FIG. 5, applications can control the display through the Graphics Device Interface (GDI) 142 and the display device API 144. GDI provides a set of high level 2D graphics functions, which are carried out in the DIB (Device Independent Bitmap) engine 146 and in the display hardware 148 through a Windows Device Driver Interface 150. The use and operation of these graphics components in the Windows Operating System from Microsoft Corp. are well known.

The display device API 144 includes functions to provide device independent, low level operations through the device driver 152. These functions include blting, flipping and lock and unlock functions used to synchronize access to surface memory. Surface memory is a region in video memory (or possibly main memory) where an array of image data such as a pixmap, alpha buffer or z buffer is stored.

The API also includes a function to return the capabilities of the underlying display device and HEL. If the display device does not have a capability required to process an API request, the display device API can use the HEL and the resources of the host to provide the capability.

The display device API provides access to hardware capabilities through the device driver, and supports software emulation in the HEL. In this particular implementation, the HEL can utilize GDI and the DIB engine to provide software emulation for graphics operations such as blts.

In FIG. 6, applications 160 can perform sound-related functions using the Wave functions 162 in the Windows API set or in the sound device API 164. The wave functions 162 access a sound device such as the sound card 166 shown in FIG. 6 through a Windows Audio device dependent interface (DDI) 168.

The sound device API 164 provides low level device independent access to the sound card 166 through a device specific driver 170. The device API includes functions to create and manipulate sound buffers used to store digital sound data. The API also includes a function to return the capabilities of the sound device 166 and HEL 172, a sound device emulation layer. If a function cannot be performed using the sound device, the sound API uses the HEL 172 to perform the function using the host CPU and main memory.

In one embodiment, the multimedia APIs shown in FIG. 2 are implemented as objects that represents the underlying device hardware. Each of the multimedia APIs include a function to create an instance of a device object representing the underlying media hardware. For example, the display device interface includes a function to create an instance of a display device object, the sound device API includes a function to create an instance of a sound device object, the 3D API includes a function to create an instance of a 3D device object, etc.

There can be one instance of a device object for every logical media device in operation. For example, there can be one instance of a display device object for every display device in operation. A software development environment may have two monitors, one running a game using the display device interface shown in FIG. 2, and another running the development environment using an alternative display device interface such as GDI (the graphics device interface), which is part of the Windows® 95 operating system from Microsoft Corporation.

The device object in this particular architecture owns the global attributes and capabilities for the device that it represents. FIG. 7 illustrates examples of different media device objects 180, 182, 184 along with examples of attributes and capabilities that they manage. As depicted in FIG. 7, the display device object 180 owns global attributes of the display device (e.g. video card) that it represents including, for example, the display mode, video memory, overlay capabilities, available palette capabilities and pixel formats, etc. The display device object 180, in this implementation, also controls default values for the global attributes such as the color key values, color depth, resolution and the hardware's display mode.

The sound device object 182 controls the global attributes and capabilities of the sound device that it represents including the master volume, sample rate capabilities, sound mixing capabilities, available device memory, etc.

Similarly, the 3D device object 184 controls the global attributes and capabilities of the 3D accelerator that it represents. This can include, for example, the vertex formats for geometric primitives, transform and lighting capabilities, the maximum size of an execute buffer, and maximum vertex count. The execute buffer refers to a region in memory for storing rendering commands and geometric primitives to be rendered according to those commands. For some devices, the execute buffer can be located on the device, while in others, the execute buffer is located in main memory of the host.

Each of the media objects include a member function to get the hardware and software capabilities of the respective media device and software emulators. To invoke these member functions, the application specifies the media device object and also provides a pointer to capabilities structure to be filled with the capabilities. To get software capabilities, the application provides a pointer to a capabilities structure to be filled with available software capabilities, and to get hardware capabilities, the application provides another pointer to a capabilities structure to be filled with available hardware capabilities. In response to a call to get the device or software capabilities, the media device object returns a capabilities structure filled with capabilities. Examples of these member functions for display, sound, and 3D device objects are provided with a description of corresponding capabilities structures in Appendix A, which is incorporated by reference. In Appendix A, these example functions are referred to as "GetCaps."

In addition to the function for returning capabilities, each of the media device objects include member functions to create objects that provide access to and control of the respective media hardware. The media device objects create instances of objects in the context of the hardware that they represent. Thus, when invoking these functions to create instances of these objects, an application can only create instances of objects compatible with the capabilities of the media objects capabilities. A few examples will help illustrate this concept.

The display device object includes member functions to create surface, palette, and clipper objects. The relationship between palette and surface objects and the display device object that corresponds to them is illustrated in FIG. 7 by the arrow from the display device object 180 to the palette object 186 and the surface objects 188 and 190.

A surface object represents a region in memory that holds a pixmap, an alpha buffer, or a Z buffer, for example. The member functions of the surface object provides services for managing and manipulating surfaces. These services include functions to flip surfaces, attach or detach a surface from another surface, perform a bit block transfer, list surfaces attached to a given surface, attach or return a palette object attached to a surface, return a clipper object attached to the surface, etc. The surface object also includes a member function to return the capabilities of a specified instance of a palette object.

A palette object is an object that represents a color table. The palette object includes member functions to get and set entries in a palette. It also include a function to return the capabilities of specified instance of a palette object.

To create these objects, the application invokes the member function specifying the display device object and the desired capabilities of the object. If the display device object cannot support a requested capability, the call will fail.

The display device object creates surface and palette objects in the context of the display hardware that it represents. Since the display device object controls the attributes of the display device, it ensures that all instances of surface objects that it creates are compatible with the display device hardware. For example, a display device object can only create a surface in YUV format on hardware that supports YUV color space conversion.

The sound device object includes a member function to create a sound buffer object. This object represents a region in memory for storing a sound or sequence of audio samples. The primary sound buffer represents the actual audio samples output to the sound device. These samples can be a single audio stream or the result of mixing several audio streams. The audio data in a primary sound buffer is typically not accessed directly by applications; however, the primary buffer can be used for control purposes, such as setting the output volume or wave format. Secondary sound buffers represent a single output stream or sound. An application can invoke member functions of the soundbuffer object to play these buffers into the primary sound buffer. Secondary sound buffers that play concurrently are mixed into the primary buffer, which is then sent to the sound device.

The sound object includes a number of member functions to control playback (play, stop, get current play position, lock or unlock a sound buffer, etc.), manage the sound environment (get and set frequency and volume), and get information about a sound buffer (return its capabilities, return the format of the sound data, etc.). To retrieve the capabilities of a sound buffer object, an application invokes a GetCaps member function specifying the instance of the object and structure to be filled with the sound buffer's capabilities.

To create an instance of a sound buffer, the application invokes a "CreateBuffer" member function of the sound device object and specifies the capabilities of the sound buffer to be created as well as the sound device object associated with it. If the sound device object does not support the capabilities of the requested sound buffer, the call will fail.

Like the display device object, the sound device object creates sound buffers in the context of the sound device that it represents. For example as shown in FIG. 7, sound buffer objects 200, 202, 204 can have specific attributes and capabilities based on the attributes and capabilities of its sound device object. The sound buffer has attributes such as volume, a specific location in memory, and a sample rate, all provided in the context of the sound device object.

The 3D device object includes a member function to create an instance of an execute buffer. An execute buffer object represents a memory region for storing a set of 3D rendering instructions, also referred to as a "display list." A display list comprises a vertex list and an instruction stream specifying how the vertex list should be lit and rendered. The execute buffer object includes member functions to get and set data in the underlying memory region holding the execute buffer and also includes lock and unlock functions to synchronize access to the execute buffer among multiple processes or threads running in the system.

To create an instance of an execute buffer object, an application invokes a CreateExecuteBuffer member function of the 3D device object and passes in the attributes of the execute buffer in a execute buffer description structure. FIG. 7 illustrates the relationship between the 3D device object 184 and an instance of an execute buffer object 210 relating to the device object. The execute buffer is created in the context of the 3D device and therefore must have attributes compatible with the 3D device object.

The media device object obtains the capabilities of the hardware it represents from the Hardware Abstraction Layer (HAL) that represents that piece of hardware. The media device object obtains its software emulation capabilities from the Hardware Emulation Layer (HEL). There can be more than one HEL and more than one HAL. In the case of multiple HALs and HELs the capabilities provided by them can be presented through the media API either separately or as a composite depending on the media type.

The HAL obtains the capabilities of the hardware through its intimate knowledge of the hardware it was written for. HALs are predominately implemented by the manufacturers of the hardware and as a result they are capable of determining the version and capabilities of the hardware down to the fabrication facility that created them. These HALs can be implemented by anyone skilled in the art of software development. They generally require a specialized software development kit from the provider of the media device API which defines the interface between the media device API and the HAL.

The HEL knows the software emulation it provides because the author of the HEL knows what emulation algorithms were incorporated in it. HELs are predominately implemented by the provider of the media device APIs. They can be implemented by anyone skilled in the art of software development. They generally require a specialized software development kit from the provider of the media device API which defines the interface between the media device API and the HEL.

Some hardware capabilities require software augmentation. When this type of functionality is being reported through the capabilities method (GetCaps in one implementation) of the media device API, it reports the capability requiring software preparation as HW ASSIST (hardware assist). This allows a client of the media device API to know that some software preparation of the media type wMll be done before the hardware can be used to perform the acceleration.

Blter Example

An example of exploiting a display specific media device API that has this capability from an application follows. The application calls the display specific media device API and asks for the hardware capabilities of the device. The API reports that the device can do source copy blts (one for one copies) from video memory to video memory but that it can not do transparent blts (copies that don't copy one specified color) from video memory to video memory. Video memory, in this context, refers to memory that the video display card can access with its hardware accelerators. Video memory is typically a scarce resource on current display devices, but using the display device blter to move the video memory around is also typically two or three times faster than the host processor. The application can modify its behavior with regard to the capability information returned by the display specific media device API by putting all of its pixmaps (media that can be blted) that don't require transparent blting into video memory, in order of their usage priority, until the video memory is gone. If the hardware had reported that it supported transparent blting the application may have loaded pixmaps that required transparent blting into video memory, over pixmaps that don't. Transparent blting is even more costly, when done on the host than source copy blting is. For the pixmaps that do not fit in the memory that is hardware accessible, the application can ask if the display specific media device API can perform the transparent blt operation without the hardware by emulating the feature in software. If the API can provide software emulation, then the application has a choice whether or not to use the software emulation provided by the API, or use the application's own algorithms. This is a very important option for real time applications and games. Blting is just one example of display functionality that may be provided by a display device to a host PC, other examples include overlays, 3D rasterization acceleration, decompression, etc. This is just one example of display functionality that may be exposed to an application through a media device API that is capable of reporting both hardware and software capabilities it offers.

Mixing Example

Another example, of exploiting a audio specific media device API that has this capability, from an application follows. The application calls the audio specific media device API and asks for the hardware capabilities of the device. The API reports that the device can do hardware mixing for sound buffers that are created in audio memory. Audio memory in this context refers to memory that the audio device can access with its mixer. The API may also report that it can mix a maximum of sixteen sounds at one time and that they must all be of the same format. Given this information, if the application wants to tune its performance to the hardware, it would load the sounds that it uses together most often into the audio memory of the device and use the audio devices mixer (a mixer merges multiple sounds into one). Mixing is a time consuming process for the host processor and the more sounds that are mixed together the more time it consumes. The application can determine from the software capabilities whether or not sound mixing is supported and then choose whether to use the software emulation provided by the audio specific media device API or its own custom solution. Audio mixing is just one example of audio functionality that may be provided by an audio device to a host PC, other examples include 3D positional audio, effects like reverb, format conversion, decompression, etc. This is just one example of audio functionality that may be exposed to an application through a media device API that is capable of reporting both the hardware and software capabilities it offers.

Applications which use media device APIs with the ability to report hardware and software capabilities do not have to use this capability. The media device API is useable without coding specific knowledge of where (software or hardware) the function will be performed into the application. This is important, because even real time applications and game generally only tune the critical pieces of their application. The other pieces just need to work, so the ability to use the media device API without regard to the specific source of the capabilities is an important feature of this type of interface as well.

The media device API is capable of modifying the storage of any media type if the storage is not good for the software emulation being provided. An example, building on the previous example Blter Example above, of this would be the creation of a pixmap in video memory (which can be slower to access from the host processor) followed by requests for operations that are not supported in hardware by the display device. Again, looking at the Blter Example, an example of a common feature that might not be provided in hardware would be transparent blting. The display specific media device API is able to tune its own performance, in this case by moving the pixmap from video memory into host memory, so the software emulation required for the operation the application requested, can be carried out at maximum speed. Host memory, in this context, is any memory that is quickly accessible to the host processor and is not allocated to the display device. This is only one example of the optimizations that the media device API can make, because it knows specifically what the hardware can and can't do, in order to provide the application with tuned performance.

One way to implement the media device object functions described above is to implement them as a COM interface. The objects in the media device (display, sound, 3D, input and multiplayer or "player" device) objects described above and in Appendix A are implemented as COM interfaces. The member functions of the object types include the standard member function of a COM interface in addition to the specific functions described above. The design and function of a COM interface is well understood in the field and is described in several publicly available documents including "Inside OLE" by Kraig Brockschmidt, MS Press.

Having described and illustrated the principles of our invention with reference to a preferred embodiment and several alternative embodiments, it should be apparent that the invention can be modified in arrangement and detail without departing from its principles. Accordingly, we claim all modifications as may come within the scope and spirit of the following claims.

APPENDIX

Forming a part of the present specification is the following:

Appendix A (Copyright in the appendix is maintained by Microsoft Corporation).

APPENDIX A

Copyright in the following material is retained by Microsoft Corporation of Redmond, Washington.

The following is an example of the interface function for returning hardware and software capabilities of a display device:

```
HRESULT GetCaps(
    LPDIRECTDRAW lpDD,
    LPDDCAPS lpDDDriverCaps,
    LPDDCAPS lpDDHELCaps)
```

This function fills in the raw (not remaining) capabilities of the device driver (the hardware) and/or the Hardware Emulation Layer (HEL).

It returns DD_OK if successful, otherwise it returns one of the following error values:

DDERR_INVALIDOBJECT (invalid object)
DDERR_INVALIDPARAMS (invalid parameters)

lpDD
    Points to the DirectDraw structure representing the DirectDraw object.
lpDDDriverCaps
    Points to a DDCAPS structure that will be filled in with the capabilities of the hardware (as reported by the device driver).
lpDDHELCaps
    Points to a DDCAPS structure that will be filled in with the capabilities of the Hardware Emulation Layer (HEL).

DDCAPS Structure:

```
typedef struct _DDCAPS {
    DWORD    dwSize;
    DWORD    dwCaps;
    DWORD    dwCaps2;
    DWORD    dwCKeyCaps;
    DWORD    dwFXCaps;
    DWORD    dwFXAlphaCaps;
    DWORD    dwPalCaps;
    DWORD    dwSVCaps;
    DWORD    dwAlphaBltConstBitDepths;
    DWORD    dwAlphaBltPixelBitDepths;
    DWORD    dwAlphaBltSurfaceBitDepths;
    DWORD    dwAlphaOverlayConstBitDepths;
    DWORD    dwAlphaOverlayPixelBitDepths;
    DWORD    dwAlphaOverlaySurfaceBitDepths;
    DWORD    dwZBufferBitDepths;
    DWORD    dwVidMemTotal;
    DWORD    dwVidMemFree;
    DWORD    dwMaxVisibleOverlays;
    DWORD    dwCurrVisibleOverlays;
    DWORD    dwNumFourCCCodes;
    DWORD    dwAlignBoundarySrc;
    DWORD    dwAlignSizeSrc;
    DWORD    dwAlignBoundaryDest;
    DWORD    dwAlignSizeDest;
    DWORD    dwAlignStrideAlign;
    DWORD    dwRops[DD_ROP_SPACE];
    DDSCAPS  ddsCaps;
    DWORD    dwMinOverlayStretch;
    DWORD    dwMaxOverlayStretch;
    DWORD    dwMinLiveVideoStretch;
    DWORD    dwMaxLiveVideoStretch;
    DWORD    dwMinHwCodecStretch;
    DWORD    dwMaxHwCodecStretch;
    DWORD    dwReserved1;
    DWORD    dwReserved2;
    DWORD    dwReserved3;
} DDCAPS,FAR* LPDDCAPS;
``` dwSize
    Size of structure. Must be initialized before use.
dwCaps
    Driver-specific capabilities.
DDCAPS_3D
    Display hardware has 3D acceleration.
DDCAPS_ALIGNBOUNDARYDEST
    Indicates that DirectDraw will support only source rectangles whose X axis is aligned on DDCAPS.dwAlignBoundaryDest boundaries of the surface, respectively.
DDCAPS_ALIGNSIZEDEST
    Indicates that DirectDraw will support only source rectangles whose X axis size in BYTEs are DDCAPS.dwAlignSizeDest multiples, respectively.
DDCAPS_ALIGNBOUNDARYSRC
    Indicates that DirectDraw will support only source rectangles whose X axis is aligned on DDCAPS.dwAlignBoundarySrc boundaries of the surface, respectively.

APPENDIX A-continued

Copyright in the following material is retained by Microsoft Corporation of Redmond, Washington.

DDCAPS_ALIGNSIZESRC
    Indicates that DirectDraw will support only source rectangles whose X axis size in BYTEs are DDCAPS.dwAlignSizeSrc multiples, respectively.
DDCAPS_ALIGNSTRIDE
    Indicates that DirectDraw will create video memory surfaces that have a stride alignment equal to DDCAPS.dwAlignStrideAlign.
DDCAPS_BANKSWITCHED
    Display hardware is bank switched, and potentially very slow at random access to VRAM.
DDCAPS_BLT
    Display hardware is capable of blit operations.
DDCAPS_BLTCOLORFILL
    Display hardware is capable of color fill with blitter.
DDCAPS_BLTQUEUE
    Display hardware is capable of asynchronous blit operations.
DDCAPS_BLTFOURCC
    Display hardware is capable of color space conversions during the blit operations.
DDCAPS_BLTSTRETCH
    Display hardware is capable of stretching during blit operations.
DDCAPS_GDI
    Display hardware is shared with GDI.
DDCAPS_OVERLAY
    Display hardware can overlay.
DDCAPS_OVERLAYCANTCLIP
    Set if display hardware supports overlays but can not clip them.
DDCAPS_OVERLAYFOURCC
    Indicates that overlay hardware is capable of color space conversions during the overlay operation.
DDCAPS_OVERLAYSTRETCH
    Indicates that stretching can be done by the overlay hardware.
DDCAPS_PALETTE
    Indicates that DirectDraw is capable of creating and supporting DirectDrawPalette objects for more than the primary surface.
DDCAPS_PALETTECANVSYNC
    Indicates that DirectDraw is capable of updating the palette in sync with the vertical refresh.
DDCAPS_READSCANLINE
    Display hardware can return the current scan line.
DDCAPS_STEREOVIEW
    Display hardware has stereo vision capabilities.
    DDSCAPS_PRIMARYSURFACELEFT can be created.
DDCAPS_VBI
    Display hardware is capable of generating a vertical blank interrupt.
DDCAPS_ZBLTS
    Supports the use of Z buffers with blit operations.
DDCAPS_ZOVERLAYS
    Supports the use of OverlayZOrder as a Z value for overlays to control their layering.
DDCAPS_COLORKEY
    Supports some form of color key in either overlay or blit operations. More specific color key capability information can be found in the dwCKeyCaps field.
DDCAPS_ALPHA
    Display hardware supports alpha channel during blit operations.
DDCAPS_COLORKEY_HWASSIST
    Colorkey is hardware assisted.
DDCAPS_NOHARDWARE
    No hardware support at all.
dwCaps2
    More driver-specific capabilities.
DDCAPS2_CERTIFIED
    Display hardware is certified.
dwCKeyCaps
    Color key capabilities.
DDCKEYCAPS_DESTBLT
    Supports transparent blitting using a color key to identify the replaceable bits of the destination surface for RGB colors.
DDCKEYCAPS_DESTBLTCLRSPACE
    Supports transparent blitting using a color space to identify the replaceable bits of the destination surface for RGB colors.
DDCKEYCAPS_DESTBLTCLRSPACEYUV
    Supports transparent blitting using a color space to identify the replaceable bits of the destination surface for YUV colors.

APPENDIX A-continued

Copyright in the following material is retained by Microsoft Corporation of Redmond, Washington.

DDCKEYCAPS_DESTBLTYUV
    Supports transparent blitting using a color key to identify the replaceable bits of the destination surface for YUV colors.
DDCKEYCAPS_DESTOVERLAY
    Supports overlaying using colorkeying of the replaceable bits of the surface being overlayed for RGB colors.
DDCKEYCAPS_DESTOVERLAYCLRSPACE
    Supports a color space as the color key for the destination for RGB colors.
DDCKEYCAPS_DESTOVERLAYCLRSPACEYUV
    Supports a color space as the color key for the destination for YUV colors.
DDCKEYCAPS_DESTOVERLAYONEACTIVE
    Supports only one active destination color key value for visible overlay surfaces.
DDCKEYCAPS_DESTOVERLAYYUV
    Supports overlaying using colorkeying of the replaceable bits of the surface being overlayed for YUV colors.
DDCKEYCAPS_SRCBLT
    Supports transparent blitting using the color key for the source with this surface for RGB colors.
DDCKEYCAPS_SRCBLTCLRSPACE
    Supports transparent blitting using a color space for the source with this surface for RGB colors.
DDCKEYCAPS_SRCBLTCLRSPACEYUV
    Supports transparent blitting using a color space for the source with this surface for YUV colors.
DDCKEYCAPS_SRCBLTYUV
    Supports transparent blitting using the color key for the source with this surface for YUV colors.
DDCKEYCAPS_SRCOVERLAY
    Supports overlays using the color key for the source with this overlay surface for RGB colors.
DDCKEYCAPS_SRCOVERLAYCLRSPACE
    Supports overlays using a color space as the source color key for the overlay surface for RGB colors.
DDCKEYCAPS_SRCOVERLAYCLRSPACEYUV
    Supports overlays using a color space as the source color key for the overlay surface for YUV colors.
DDCKEYCAPS_SRCOVERLAYONEACTIVE
    Supports only one active source color key value for visible overlay surfaces.
DDCKEYCAPS_SRCOVERLAYYUV
    Supports overlays using the color key for the source with this overlay surface for YUV colors.
dwFXCaps
    Driver-specific stretching and effects capabilities.
DDFXCAPS_BLTARITHSTRETCHY
    Uses arithmetic operations to stretch and shrink surfaces during blit rather than pixel doubling techniques. Along the Y axis.
DDFXCAPS_BLTARITHSTRETCHYN
    Uses arithmetic operations to stretch and shrink surfaces during blit rather than pixel doubling techniques. Along the Y axis. Only works for x1, x2, etc.
DDFXCAPS_BLTMIRRORLEFTRIGHT
    Supports mirroring left to right in blit.
DDFXCAPS_BLTMIRRORUPDOWN
    Supports mirroring top to bottom in blit.
DDFXCAPS_BLTROTATION
    Supports arbitrary rotation.
DDFXCAPS_BLTROTATION90
    Supports 90 degree rotations.
DDFXCAPS_BLTSHRINKX
    Supports arbitrary shrinking of a surface along the x axis (horizontal direction). This flag is only valid for blit operations.
DDFXCAPS_BLTSHRHRINKXN
    Supports integer shrinking (1x, 2x,) of a surface along the x axis (horizontal direction). This flag is only valid for blit operations.
DDFXCAPS_BLTSHRINKY
    Supports arbitrary shrinking of a surface along the y axis (horizontal direction). This flag is only valid for blit operations.
DDFXCAPS_BLTSHRINKYN
    Supports integer shrinking (1x, 2x,) of a surface along the y axis (vertical direction). This flag is only valid for blit operations.
DDFXCAPS_BLTSTRETCHX
    Supports arbitrary stretching of a surface along the x axis (horizontal direction). This flag is only valid for blit operations.
DDFXCAPS_BLTSTRETCHXN
    Supports integer stretching (1x, 2x,) of a surface along the x axis (horizontal direction). This flag is only valid for blit operations.

APPENDIX A-continued

Copyright in the following material is retained by Microsoft Corporation of Redmond, Washington.

DDFXCAPS_BLTSTRETCHY
    Supports arbitrary stretching of a surface along the y axis (horizontal direction). This flag is only valid for blit operations.
DDFXCAPS_BLTSTRETCHYN
    Supports integer stretching (1x, 2x,) of a surface along the y axis (vertical direction). This flag is only valid for blit operations.
DDFXCAPS_OVERLAYARITHSTRETCHY
    Uses arithmetic operations to stretch and shrink surfaces during overlay rather than pixel doubling techniques. Along the Y axis.
DDFXCAPS_OVERLAYARITHSTRETCHYN
    Uses arithmetic operations to stretch and shrink surfaces during overlay rather than pixel doubling techniques. Along the Y axis. Only works for x1, x2, etc.
DDFXCAPS_OVERLAYSHRINKX
    Supports arbitrary shrinking of a surface along the x axis (horizontal direction). This flag is only valid for DDSCAPS_OVERLAY surfaces. This flag only indicates the capabilities of a surface. It does not indicate that shrinking is available.
DDFXCAPS_OVERLAYSHRINKXN
    Supports integer shrinking (1x, 2x,) of a surface along the x axis (horizontal direction). This flag is only valid for DDSCAPS_OVERLAY surfaces. This flag only indicates the capabilities of a surface. It does not indicate that shrinking is available.
DDFXCAPS_OVERLAYSHRINKY
    Supports arbitrary shrinking of a surface along the y axis (vertical direction). This flag is only valid for DDSCAPS_OVERLAY surfaces. This flag only indicates the capabilities of a surface. It does not indicate that shrinking is available.
DDFXCAPS_OVERLAYSHRINKYN
    Supports integer shrinking (1x, 2x,) of a surface along the y axis (vertical direction). This flag is only valid for DDSCAPS_OVERLAY surfaces. This flag only indicates the capabilities of a surface. It does not indicate that shrinking is available.
DDFXCAPS_OVERLAYSTRETCHX
    Supports arbitrary stretching of a surface along the x axis (horizontal direction). This flag is only valid for DDSCAPS_OVERLAY surfaces. This flag only indicates the capabilities of a surface. It does not indicate that stretching is available.
DDFXCAPS_OVERLAYSTRETCHXN
    Supports integer stretching (1x, 2x,) of a surface along the x axis (horizontal direction). This flag is only valid for DDSCAPS_OVERLAY surfaces. This flag only indicates the capabilities of a surface. It does not indicate that stretching is available.
DDFXCAPS_OVERLAYSTRETCHY
    Supports arbitrary stretching of a surface along the y axis (vertical direction). This flag is only valid for DDSCAPS_OVERLAY surfaces. This flag only indicates the capabilities of a surface. It does not indicate that stretching is available.
DDFXCAPS_OVERLAYSTRETCHYN
    Supports integer stretching (1x, 2x,) of a surface along the y axis (vertical direction). This flag is only valid for DDSCAPS_OVERLAY surfaces. This flag only indicates the capabilities of a surface. It does not indicate that stretching is available.
DDFXCAPS_OVERLAYMIRRORLEFTRIGHT
    Supports mirroring of overlays across the vertical axis.
DDFXCAPS_OVERLAYMIRRORUPDOWN
    Supports mirroring of overlays across the horizontal axis.
dwFXAlphaCaps
    Driver specific alpha capabilities.
DDFXALPHACAPS_BLTALPHAEDGEBLEND
    Supports alpha blending around the edge of a source color keyed surface. For Blt.
DDFXALPHACAPS_BLTALPHAPIXELS
    Supports alpha information in the pixel format. The bit depth of alpha information in the pixel format can be 1,2,4, or 8. The alpha value becomes more opaque as the alpha value increases. (0 is transparent.) For Blt.
DDFXALPHACAPS_BLTALPHAPIXELSNEG
    Supports alpha information in the pixel format. The bit depth of alpha information in the pixel format can be 1,2,4, or 8. The alpha value becomes more transparent as the alpha value increases. (0 is opaque.) This flag can only be set if DDCAPS_ALPHA is set. For Blt.
DDFXALPHACAPS_BLTALPHASURFACES
    Supports alpha only surfaces. The bit depth of an alpha only surface can be 1,2,4, or 8. The alpha value becomes more opaque as the alpha value increases. (0 is transparent.) For Bit.

APPENDIX A-continued

Copyright in the following material is retained by Microsoft Corporation of Redmond, Washington.

DDFXALPHACAPS_BLTALPHASURFACESNEG
    The depth of the alpha channel data can range can be 1,2,4, or 8. The NEG
    suffix indicates that this alpha channel becomes more transparent as the alpha
    value increases. (0 is opaque.) This flag can only be set if
    DDFXCAPS_ALPHASURFACES is set. For Blt.
DDFXALPHACAPS_OVERLAYALPHAEDGEBLEND
    Supports alpha blending around the edge of a source color keyed surface. For
    Overlays.
DDFXALPHACAPS_OVERLAYALPHAPIXELS
    Supports alpha information in the pixel format. The bit depth of alpha
    information in the pixel format can be 1,2,4, or 8. The alpha value becomes
    more opaque as the alpha value increases. (0 is transparent.) For Overlays.
DDFXALPHACAPS_OVERLAYALPHAPIXELSNEG
    Supports alpha information in the pixel format. The bit depth of alpha
    information in the pixel format can be 1,2,4, or 8. The alpha value becomes
    more transparent as the alpha value increases. (0 is opaque.) This flag can
    only be set if DDFXCAPS_ALPHAPIXELS is set. For Overlays.
DDFXALPHACAPS_OVERLAYALPHASURFACES
    Supports alpha only surfaces. The bit depth of an alpha only surface can be
    1,2,4, or 8. The alpha value becomes more opaque as the alpha value
    increases. (0 is transparent.) For Overlays.
DDFXALPHACAPS_OVERLAYALPHASURFACESNEG
    The depth of the alpha channel data can range can be 1,2,4, or 8. The NEG
    suffix indicates that this alpha channel becomes more transparent as the alpha
    value increases. (0 is opaque.) This flag can only be set if
    DDFXCAPS_ALPHASURFACES is set. For Overlays.
dwPalCaps
    Palette capabilities.
DDPCAPS_4BIT
    Index is 4 bits. There are sixteen color entries in the palette table.
DDPCAPS_8BITENTRIES
    Index is onto an 8 bit color index. This field is only valid with the
    DDPCAPS_4BIT capability and the target surface is in 8bpp. Each color
    entry is one byte long and is an index into destination surfaces 8bpp palette.
DDPCAPS_8BIT
    Index is 8 bits. There are 256 color entries in the palette table.
DDPCAPS_ALLOW256
    This palette can have all 256 entries defined.
DDPCAPS_INITIALIZE
    Indicates that this DirectDrawPalette should use the palette color array
    passed into the lpDDColorArray parameter to initialize the DirectDrawPalette
    object.
DDPCAPS_PRIMARYSURFACE
    This palette is the one attached to the primary surface. Changing this table has
    immediate effect on the display unless DDPAL_VSYNC is specified and
    supported.
DDPCAPS_PRIMARYSURFACELEFT
    This palette is the one attached to the primary surface left. Changing this table
    has immediate effect on the display unless DDPAL_VSYNC is specified and
    supported.
DDPCAPS_VSYNC
    This palette can have modifications to it synced with the monitors refresh
    rate.
dwSVCaps
    Stereo vision capabilities.
DDSVCAPS_ENIGMA
    The stereo view is accomplished using Enigma encoding.
DDSVCAPS_FLICKER
    The stereo view is accomplished using high-frequency flickering.
DDSVCAPS_REDBLUE
    The stereo view is accomplished using red and blue filters applied to the left
    and right eyes. All images must adapt their color spaces for this process.
DDSVCAPS_SPLIT
    The stereo view is accomplished with split-screen technology.
dwAlphaBltConstBitDepths
    DDBD_2,4,8
dwAlphaBltPixelBitDepths
    DDBD_1,2,4,8
dwAlphaBltSurfaceBitDepths
    DDBD_1,2,4,8
dwAlphaOverlayConstBitDepths
    DDBD_2,4,8
dwAlphaOverlayPixelBitDepths
    DDBD_1,2,4,8
dwAlphaOverlaySurfaceBitDepths
    DDBD_1,2,4,8

APPENDIX A-continued

Copyright in the following material is retained by Microsoft Corporation of Redmond, Washington.

```
dwZBufferBitDepths
        DDBD_8,16,24,32
dwVidMemTotal
        Total amount of video memory.
dwVidMemFree
        Amount of free video memory.
dwMaxVisibleOverlays
        Maximum number of visible overlays.
dwCurrVisibleOverlays
        Current number of visible overlays.
dwNumFourCCCodes
        Number of FOURCC codes.
dwAlignBoundarySrc
        Source rectangle alignment.
dwAlignSizeSrc
        Source rectangle byte size.
dwAlignBoundaryDest
        Destination rectangle alignment.
dwAlignSizeDest
        Destination rectangle byte size.
dwAlignStrideAlign
        Stride alignment.
dwRops[DD_ROP_SPACE]
        ROPS supported.
ddsCaps
        DDSCAPS structure with general capabilities.
dwMinOverlayStretch
        Minimum overlay stretch factor multiplied by 1000.
dwMaxOverlayStretch
        Maximum overlay stretch factor multiplied by 1000.
dwMinLiveVideoStretch
        Minimum live video stretch factor multiplied by 1000, eg 1000 == 1.0,
        1300 == 1.3
dwMaxLiveVideoStretch
        Maximum live video stretch factor multiplied by 1000, eg 1000 == 1.0, 1300
        == 1.3
dwMinHwCodecStretch
        Minimum hardware codec stretch factor multiplied by 1000, eg 1000 == 1.0,
        1300 == 1.3
dwMaxHwCodecStretch;
        Maximum hardware codec stretch factor multiplied by 1000, eg 1000 == 1.0,
        1300 == 1.3
dwReserved1,dwReserved2,dwReserved3
        Reserved.
dw . . . BitDepths
DDBD_1     1 bit per pixel.
DDBD_2     2 bits per pixel.
DDBD_4     4 bits per pixel.
DDBD_8     8 bits per pixel.
DDBD_16    16 bits per pixel.
DDBD_24    24 bits per pixel.
DDBD_32    32 bits per pixel.
        The following is a surface object member function for returning the
capabilities of a surface.
HRESULT GetCaps(
    LPDIRECTDRAWSURFACE lpDDSurface,
    LPDDSCAPS lpDDSCaps)
        The GetCaps function gets the capabilities of the surface, and places them in
Surface Capabilities structure (DDSCAPS). The surface capabilities are not
necessarily related to the capabilities of the display device.
It returns DD_OK if successful, otherwise it returns one of the following error
values:
DDERR_INVALIDOBJECT DDERR_INVALIDPARAMS
lpDDSurface
        Points to the DirectDrawSurface structure representing the
        DirectDrawSurface.
lpDDCaps
        Points to a DDCAPS structure that will be filled in with the hardware
        capabilities of the surface.
        DDSCAPs
typedef struct_DDSCAPS{
        DWORD dwCaps;
} DDSCAPS, FAR* LPDDSCAPS;
dwCaps
DDSCAPS_3D
        Indicates that this surface is a front buffer, back buffer, or texture map that is
```

APPENDIX A-continued

Copyright in the following material is retained by Microsoft Corporation of Redmond, Washington.

being used in conjunction with a 3DDDI or Direct3D Hardware Abstraction Layer (HAL).

DDSCAPS_ALPHA
Indicates that this surface contains alpha information. The pixel format must be interrogated to determine whether this surface contains only alpha information or alpha information interlaced with pixel color data (e.g. RGBA or YUVA).

DDSCAPS_BACKBUFFER
Indicates that this surface is a backbuffer. It is generally set by DirectDraw::CreateSurface when the DDSCAPS_FLIP capability bit is set. It indicates that this surface is THE back buffer of a surface flipping structure. DirectDraw supports N surfaces in a surface flipping structure. Only the surface that immediately precedes the DDSCAPS_FRONTBUFFER has this capability bit set. The other surfaces are identified as back buffers by the presence of the DDSCAPS_FLIP capability, their attachment order, and the absence of the DDSCAPS_FRONTBUFFER and DDSCAPS_BACKBUFFER capabilities. The bit is sent to IDirectDraw::CreateSurface when a standalone back buffer is being created. This surface could be attached to a front buffer and/or back buffers to form a flipping surface structure after the IDirectDraw::CreateSurface call. See DirectDrawSurface::AddAttachedSurface for a detailed description of the behaviors in this case.

DDSCAPS_COMPLEX
Indicates a complex surface structure is being described. A complex surface structure results in the creation of more than one surface. The additional surfaces are attached to the root surface. The complex structure can only be destroyed by destroying the root.

DDSCAPS_FLIP
Indicates that this surface is a part of a surface flipping structure. When it is passed to IDirectDraw::CreateSurface the DDSCAPS_FRONTBUFFER and DDSCAPS_BACKBUFFER bits are not set. They are set by IDirectDraw::CreateSurface on the resulting creations. The dwBackBufferCount field in the DDSURFACEDESC structure must be set to at least 1 in order for the IDirectDraw::CreateSurface call to succeed. The DDSCAPS_COMPLEX capability must always be set when creating multiple surfaces through IDirectDraw::CreateSurface.

DDSCAPS_FRONTBUFFER
Indicates that this surface is THE front buffer of a surface flipping structure. It is generally set by IDirectDraw::CreateSurface when the DDSCAPS_FLIP capability bit is set. If this capability is sent to IDirectDraw::CreateSurface then a standalone front buffer is created. This surface will not have the DDSCAPS_FLIP capability. It can be attached to other back buffers to form a flipping structure. See IDirectDrawSurface::AddAttachedSurface for a detailed description of the behaviors in this case.

DDSCAPS_HWCODEC
Indicates surface should be able to have a stream decompressed to it by the hardware.

DDSCAPS_LIVEVIDEO
Indicates surface should be able to receive live video.

DDSCAPS_MODEX
Surface is a 320×200 or 320×240 ModeX surface.

DDSCAPS_OFFSCREENPLAIN
Indicates that this surface is any offscreen surface that is not an overlay, texture, Z buffer, front buffer, back buffer, or alpha surface. It is used to identify plain vanilla surfaces.

DDSCAPS_OWNDC
Indicates surface will have a DC associated long term.

DDSCAPS_OVERLAY
Indicates that this surface is an overlay. It may or may not be directly visible depending on whether or not it is currently being overlayed onto the primary surface. DDSCAPS_VISIBLE can be used to determine whether or not it is being overlayed at the moment.

DDSCAPS_PALETTE
Indicates that unique DirectDrawPalette objects can be created and attached to this surface.

DDSCAPS_PRIMARYSURFACE
Indicates that this surface is the primary surface. The primary surface represents what the user is seeing at the moment.

DDSCAPS_PRIMARYSURFACELEFT
Indicates that this surface is the primary surface for the left eye. The primary surface for the left eye represents what the user is seeing at the moment with the user's left eye. When this surface is created the DDSCAPS_PRIMARYSURFACE represents what the user is seeing with the user's right eye.

DDSCAPS_SYSTEMMEMORY
Indicates that this surface memory was allocated in system memory.

APPENDIX A-continued

Copyright in the following material is retained by Microsoft Corporation of Redmond, Washington.

DDSCAPS_TEXTURE
    Indicates that this surface can be used as a 3D texture. It does not indicate whether or not the surface is being used for that purpose.
DDSCAPS_VIDEOMEMORY
    Indicates that this surface exists in video memory.
DDSCAPS_VISIBLE
    Indicates that changes made to this surface are immediately visible. It is always set for the primary surface and is set for overlays while they are being overlayed and texture maps while they are being textured.
DDSCAPS_WRITEONLY
    Indicates that only writes are permitted to the surface. Read accesses from the surface may or may not generate a protection fault, but the results of a read from this surface will not be meaningful.
DDSCAPS_ZBUFFER
    Indicates that this surface is the Z buffer. The Z buffer does not contain displayable information. Instead, it contains bit depth information that is used to determine which pixels are visible and which are obscured.
    The following is one example of GetCaps member function for a palette object.

```
HRESULT GetCaps(
    LPDIRECTDRAWPALETTE lpDDPalette,
    LPDWORD lpdwCaps)
```
    It fills a palette structure with the capabilities of this palette object.
    It returns DD_OK if successful, otherwise it returns one of the following error values:
DDERR_INVALIDOBJECT DDERR_INVALIDPARAMS
lpDDPalette
    Points to the DirectDrawpalette structure returned to the application when the DirectDrawPalette was created.
lpdwCaps
Flags for lpdwCaps.
DDPCAPS_4BIT    DDPCAPS_8BITENTRIES
DDPCAPS_8BIT    DDPCAPS_ALLOW256
DDPCAPS_PRIMARYSURFACE    DDPCAPS_PRIMARYSURFACELEFT
DDPCAPS_VSYNC
    The following is an example of the GetCaps member function for a sound device object.

```
HRESULT GetCaps(
    LPDIRECTSOUND lpDirectSound,
    LPDSCAPS lpDSCaps);
```
    It retrieves the capabilities of the hardware device represented by the DirectSound object.
    The GetCaps function for a sound device object returns DS_OK if successful or DSERR_INVALIDPARAM otherwise.
lpDirectSound
    Address of the DirectSound object to examine.
lpDSCaps
    Address of the DSCAPS structure to contain the capabilities of this sound device.
Information retrieved in the DSCAPS structure contains information about the maximum capabilities of the sound device and currently available capabilities, such as the number of hardware mixing channels and amount of onboard sound memory. This information can be used to tune performance and optimize resource allocation.
Due to resource sharing requirements, the maximum capabilities in one area might only be available at the cost of another area. For example, the maximum number of hardware-mixed streaming buffers may only be available if there are no hardware static buffers.
    An application that explicitly requests hardware resources retrieves a description of the sound card capabilities by calling GetCaps before creating each buffer, and should create buffers in order of their importance.

```
typedef struct_DSCAPS {
    DWORD   dwSize;                          // see below
    DWORD   dwFlags;                         // see below
    DWORD   dwMinSecondarySampleRate;        // see below
    DWORD   dwMaxSecondarySampleRate;        // see below
    DWORD   dwPrimaryBuffers;                // see below
    DWORD   dwMaxHwMixingAllBuffers;         // see below
    DWORD   dwMaxHwMixingStaticBuffers;      // see below
    DWORD   dwMaxHwMixingStreamingBuffers;      // see below
    DWORD   dwFreeHwMixingAllBuffers;        // see below
    DWORD   dwFreeHwMixingStaticBuffers;     // see below
    DWORD   dwFreeHwMixingStreamingBuffers;  // see below
    DWORD   dwMaxHw3DAllBuffers;             // see below
    DWORD   dwMaxHw3DStaticBuffers;           // see below
    DWORD   dwMaxHw3DStreamingBuffers;          // see below
    DWORD   dwFreeHw3DAllBuffers;            // see below
```

APPENDIX A-continued

Copyright in the following material is retained by Microsoft Corporation of Redmond, Washington.

```
    DWORD    dwFreeHw3DStaticBuffers;           // see below
    DWORD    dwFreeHw3DStreamingBuffers;         // see below
    DWORD    dwTotalHwMemBytes;                 // see below
    DWORD    dwFreeHwMemBytes;                  // see below
    DWORD    dwMaxContigFreeHwMemBytes;          // see below
    DWORD    dwUnlockTransferRateHwBuffers;      // see below
    DWORD    dwPlayCpuOverheadSwBuffers;        // see below
    DWORD    dwReserved1;                       // reserved. do not use
    DWORD         dwReserved2;                  // reserved. do not use
} DSCAPS, *LPDSCAPS;
```

Specifies the capabilities of a DirectSound device, for use by the
IDirectSound::GetCaps member function.
dwSize
    The size, in bytes, of the structure.
dwFlags
    Flags specifying device capabilities. This member can be one or more of the
    following values:
DSCAPS_CONTINUOUSRATE
    Device supports all sample rates between the dwMinSecondarySampleRate
    and dwMaxSecondarySampleRate values. Typically this means that the actual
    output rate will be within +/- 10Hz of the requested frequency.
DSCAPS_EMULDRIVER
    Device does not have a DirectSound driver installed, so it is being accessed
    through emulation (that is, through the waveform functions). Applications
    should expect performance degradation.
DSCAPS_CERTIFIED
    This driver has been tested and certified by Microsoft.
DSCAPS_PRIMARY16BIT
    Device supports primary buffers with 16-bit samples.
DSCAPS_PRIMARY8BIT
    Device supports primary buffers with 8-bit samples.
DSCAPS_PRIMARYMONO
    Device supports monophonic primary buffers.
DSCAPS_PRIMARYSTEREO.
    Device supports stereo primary buffers.
DSCAPS_SECONDARY16BIT
    Device supports hardware-mixed secondary buffers with 16-bit samples.
DSCAPS_SECONDARY8BIT
    Device supports hardware-mixed secondary buffers with 8-bit samples.
DSCAPS_SECONDARYMONO
    Device supports hardware-mixed monophonic secondary buffers.
DSCAPS_SECONDARYSTEREO
    Device supports hardware-mixed stereo secondary buffers.
dwMinSecondarySampleRate and dwMaxSecondarySampleRate
    Minimum and maximum sample rate specification that is supported by this
    device's hardware secondary sound buffers.
dwPrimaryBuffers
    Number of primary buffers supported. Will always be 1 for this release.
dwMaxHwMixingAllBuffers, dwMaxHwMixingStaticBuffers, and
dwMaxHwMixingStreamingBuffers
    Description of the hardware mixing capabilities of the device.
    dwMaxHwMixingAllBuffers specifies the total number of buffers, that can be
    mixed in hardware. dwMaxHwMixingStaticBuffers specifies the maximum
    number of static buffers (that is, the buffers located in onboard sound
    memory), and dwMaxHwMixingStreamingBuffers specifies the maximum
    number of streaming buffers. Note that the first member may be less than the
    sum of the others, as there are usually some resource trade-offs.
dwFreeHwMixingAllBuffers, dwFreeHwMixingStaticBuffers, and
dwFreeHwMixingStreamingBuffers
    Description of the free (unallocated) hardware mixing capabilities of the
    device. An application can use these values to determine whether hardware
    resources are available for allocation to a secondary sound buffer. Also, by
    comparing these values to the members that specify maximum mixing
    capabilities, an application can determine whether some hardware resources
    are already allocated.
dwMaxHw3DAllBuffers, dwMaxHw3DStaticBuffers, and
dwMaxHw3DStreamingBuffers
    Description of the hardware 3D positional capabilities of the device. These
    will be all be zero for the first release.
dwFreeHw3DAllBuffers, dwFreeHw3DStaticBuffers, and
dwFreeHw3DStreamingBuffers
    Description of the free (unallocated) hardware 3D positional capabilities of
    the device. These will be all be zero for the first release.
dwTotalHwMemBytes
    Size, in bytes, of the amount of memory on the sound card that can store
    static sound buffers.

APPENDIX A-continued

Copyright in the following material is retained by Microsoft Corporation of Redmond, Washington.

dwFreeHwMemBytes
    Size, in bytes, of the free memory on the sound card.
dwMaxContigFreeHwMemBytes
    Size, in bytes, of the largest contiguous block of free memory on the sound card.
dwUnlockTransferRateHwBuffers
    Description of the rate, in kilobytes per second, at which data can be transferred to hardware static sound buffers (that is, buffers located in onboard sound memory). This (and the number of bytes transferred) determines the duration of that IDirectSoundBuffer::Unlock.
dwPlayCpuOverheadSwBuffers
    Description of the CPU overhead (in percentage of CPU) needed to mix software buffers (that is, the buffer located in main system memory). This varies according to the bus type, and the processor type and clock speed.
Note that the unlock transfer rate for software buffers is zero because the data does not need to be transferred anywhere. Similarly, the play CPU overhead for hardware buffers is zero because the mixing is done by the sound device.
    The following is an example of the GetCaps member function for a sound buffer.
HRBSULT GetCaps(
    LPDIRECTSOUNDBUFFER lpDirectSoundBuffer,
    LPDSBCAPS lpDsBufferCaps);
Retrieves the capabilities of the DirectSoundBuffer object.
x    Returns DS_OK if successful or DSERR_INVALIDPARAM otherwise.
lpDirectSoundBuffer
    Address of the DirectSoundBuffer object to examine.
lpDSBufferCaps
    Address of a DSBCAPS structure to contain the capabilities of the specified sound buffer.
    The DSBCAPS structure contains similar information to the
DSBUFFERDESC structure passed to IDirectSound::CreateSoundBuffer, with some additional information. This additional information can include the location of the buffer (hardware or software), and some cost measures. Examples of cost measures include the time to download to a hardware buffer and CPU overhead to mix and play the buffer when the buffer is in system memory.
    The flags specified in the dwFlags member of the DSBCAPS structure are the same flags used by the DSBUFFERDESC structure. The only difference is that in the DSBCAPS structure, either DSBCAPS_LOCHARDWARE or
DSBCAPS_LOCSOFTWARE will be specified according to the location of the buffer memory. In the DSBUFFERDESC structure, these flags are optional and are used to force the buffer to be located in either hardware or software.
DDSBCAPS
typedef struct _DSBCAPS {
    DWORD dwSize;    // size, in bytes, of this structure
    DWORD dwFlags;    // see below
    DWORD dwBufferBytes;    // size, in bytes, of the buffer
    DWORD dwUnlockTransferRate;    // see below
    DWORD dwPlayCpuOverhead;    // see below
} DSBCAPS, *LPDSBCAPS;
Specifies the capabilities of a DirectSound buffer object, for use by the
IDirectSoundBuffer::GetCaps member function.
dwFlags
    Flags specifying buffer-object capabilities. This member can be one or more of the following values:
DSBCAPS_CTRLFREQUENCY
    Buffer must have frequency control capability.
DSBCAPS_CTRLPAN
    Buffer must have pan control capability.
DSBCAPS_CTRLVOLUME
    Buffer must have volume control capability.
DSBCAPS_LOCHARDWARE
    Forces the buffer to use hardware mixing, even if DSBCAPS_STATIC is not specified. If this device does not support hardware mixing or the required hardware memory is not available, the call to
IDirectSound::CreateSoundBuffer will fail. Note that there is no guarantee that a mixing channel will be available for this buffer - the application must make sure of this.
DSBCAPS_LOCSOFTWARE
    Forces the buffer to be stored in software (main system) memory and use software mixing, even if DSBCAPS_STATIC is specified and hardware resources are available.
DSBCAPS_PRIMARYBUFFER
    Buffer is a primary sound buffer. If not specified, a secondary buffer will be created.
DSBCAPS_STATIC
    Indicates that the buffer will be used for static sound data. Typically used for

APPENDIX A-continued

Copyright in the following material is retained by Microsoft Corporation of Redmond, Washington.

buffers which are loaded once and played many times. These buffers are candidates for hardware (onboard) memory.
dwUnlockTransferRate
        Specifies the rate, in kilobytes per second, that data is transferred to the buffer memory when IDirectSoundBuffer::Unlock is called. High-performance applications can use this value to determine the time required for IDirectSoundBuffer::Unlock to execute. For software buffers located in system memory, the rate will be very high as no processing is required. For hardware buffers, the buffer might have to be downloaded to the card which may have a limited transfer rate.
dwPlayCpuOverhead
        Specifies the CPU overhead as a percentage of main CPU cycles needed to mix this sound buffer. For hardware buffers, this member Will be zero because the mixing is performed by the sound device. For software buffers, this member depends on the buffer format and the speed of the system processor.
        The DSBCAPS structure contains similar information to the DSBUFFERDESC structure passed to IDirectSound::CreateSoundBuffer, with some additional information such as the location of the buffer (hardware or software), and some cost measures (such as the time to download the buffer, if located in hardware, and the CPU overhead to play the buffer, if mixed in software).
        Note that the dwFlags member of the DSBCAPS structure contains the same flags used by the DSBUFFBRDESC structure. The only difference is that in the DSBCAPS structure, either DSBCAPS_ILOCHARDWARE or DSBCAPS_LOCSOFTWARE will be specified, according to the location of the buffer memory. In the DSBUFFERDESC structure, these flags are optional and are used to force the buffer to be located in either hardware or software.
        DirectSound provides the ability to retrieve the hardware capabilities of the sound device used by a DirectSound object. Most applications will not need to do this; DirectSound will automatically take advantage of hardware acceleration without intervention by the application. However, high-performance applications can use this information to scale their sound requirements to the available hardware. For example, an application might play more sounds if hardware mixing is available.
        To retrieve the hardware capabilities, use the IDirectSound::GetCaps member function, which will fill in a DSCAPS structure:
AppDetermineHardwareCaps(LPDIRECTSOUND lpDirectSound)
{
DSCAPS dscaps;
HRESULT hr;
        dscaps.dwSize sizeof(DSCAPS);
hr = lpDirectSound->lpVtbl->GetCaps(lpDirectSound, &dscaps);
if(DS_OK == hr) {
        // Succeeded, now parse DSCAPS structure.
        //.
        //.
        //.
        }
        //.
        //.
        //.
}
        The DSCAPS structure contains information about the performance and resources of the sound device, including the maximum resources of each type and the currently free resources. Note that there may be trade-offs between the various resources; for example, allocating a single hardware streaming buffer might consume two static mixing channels. Applications which scale to the hardware capabilities should call GetCaps between every buffer allocation to determine if there are enough resources for the next buffer, rather than making assumptions about the resource trade-offs.
3D Devices
        The following is an example of a 3D device object member function that returns hardware and software capabilities for a 3D device and 3D rendering emulators.
HRBSULT GetCaps (LPD3DDEVICEDESC lpD3DHWDevDesc,
    LPD3DDEVICEDESC lpD3DHELDevDesc)
        It fills in the capabilities of the Direct3DDevice object. A list of the types of capabilities returned by this function are set forth in the D3DDEVICEDESC structure below.
        It returns D3D_OK if successful, or an error otherwise, which may be one of the following values:
DDERR_INVALIDOBJECT
DDERR_INVALIDPARAMS
lpD3DHWDeviceDesc
        Address of the D3DDEVICEDESC structure describing the hardware features of the device.

APPENDIX A-continued

Copyright in the following material is retained by Microsoft Corporation of Redmond, Washington.

lpD3DHELDeviceDesc
    Address of the D3DDEVICEDESC structure describing software emulation being provided.
3D Device Description Structure
```
typedef struct_D3DDeviceDesc {
    DWORD      dwSize;     // size, in bytes, of this structure
    DWORD      dwFlags;
    D3DCOLORMODEL   dcmColorModel;   // color model of the device
    DWORD      dwDevCaps;
    D3DTRANSFORMCAPS transformCaps;  // capabilities of transform
    D3DLIGHTINGCAPS lightingCaps;    // capabilities of lighting
    BOOL       bClipping;            // clipping supported
    D3DPRIMCAPS     lineCaps;
    D3DPRIMCAPS     triCaps;
    DWORD   dwMaxBufferSize; // maximum execute buffer size
    DWORD   dwMaxVertexCount; // maximum vertex count
} D3DDEVICEDESC, *LPD3DDEVICEDESC;
```
Contains a description of the current device. This structure is used to query the current device.
dwFlags
    Identifies the members of this structure that contain valid data.
D3D_COLORMODEL    The dcmColorModel member is valid.
D3D_DEVCAPS    The dwDevCaps member is valid.
D3D_TRANSFORMCAPS  The transformCaps member is valid.
D3D_LIGHTINGCAPS    The lightingCaps member is valid.
D3D_BCLIPPING  The bClipping member is valid.
D3D_LINECAPS    The lineCaps member is valid.
D3D_TRICAPS    The triCaps member is valid.
D3D_MAXBUFFERSIZE  The dwMaxBufferSize member is valid.
D3D_MAXVERTEXCOUNT    The dwMaxVertexCount member is valid.
D3D_LPD3DDEVSURFACE    The lpD3DDevSurface member is valid.
dwDevCaps
    Specifies the capabilities of the device.
DEVCAPS_FLOAT
    The device accepts floating-point data.
DEVCAPS_FLOAT_TLVERTEX
    The device accepts floating point for post-transform vertex data.
DEVCAPS_SORT_INCREASING_Z
    The device sorts for increasing z.
DEVCAPS_SORT_DECREASING_Z
    The device sorts for decreasing z.
DEVCAPS_SORT_EXACT
    The device performs an exact sort.
DEVCAPS_EXECUTE_ON_DEVICE
    The device executes in hardware memory.
lineCaps
    Specifies a D3DPRIMCAPS structure defining the device's support for line-drawing primitives.
triCaps
    Specifies a D3DPRIMCAPS structure defining the device's support for triangle primitives.
3D Primitive Capabilities
```
typedef struct_D3DPrimCaps {
    DWORD dwSize;     // size, in bytes, of this structure
    ULONG miscCaps;
    ULONG rasterCaps;
    ULONG zCmpCaps;
    ULONG sourceBlendCaps;
    ULONG destBlendCaps;
    ULONG alphaCmpCaps;
    ULONG shadeCaps;
    ULONG textureCaps;
    ULONG textureFilterCaps;
    ULONG textureBlendCaps;
    ULONG stippleWidth;
    ULONG stippleHeight;
} D3DPRIMCAPS, *LPD3DPRIMCAPS;
```
Defines the capabilities for each primitive type. This structure is used when creating a device and when querying the capabilities of a device. This structure defines several members in the D3DDEVICEDESC structure.
miscCaps
    General capabilities for this primitive. One or more of the following capabilities can be specified for a device:
D3DPRIM_MASK_PLANES
    The device can perform bit-masking of color planes.

APPENDIX A-continued

Copyright in the following material is retained by Microsoft Corporation of Redmond, Washington.

D3DPRIM_MASK_Z
    The device is capable of enabling and disabling modification of the z buffer on pixel operations.
D3DPRIM_LINE_PATTERN_REP
    The driver is capable of handling values other than 1 in the repFactor member of the D3DLINEPATTERN structure. (This applies only to line-drawing primitives.)
D3DPRIM_CULL
    The driver supports culling through the D3DSTATE_CULL_MODE state. (This applies only to triangle primitives.)
D3DPRIM_CONFORMANT
    The device is OpenGL conformant.
rasterCaps
    Provides information on raster-drawing capabilities. One or more of the following capabilities can be specified for a device:
D3DPRIM_RASTER_DITHER
    The device can dither to improve color resolution.
D3DPRIM_RASTER_ROP2
    The device can support raster operations other than R2_COPYPEN as specified with the RX_ROP2 command.
D3DPRIM_RASTER_XOR
    The device can support SRCINVERT (XOR) operations. If this flag is not set but D3DPRIM_RASTER_ROP2 is set, then XOR operations must still be supported.
D3DPRIM_RASTER_PAT
    The driver can perform patterned drawing (lines or fills with D3DSTATE_LINE_PATTERN or D3DSTATE_STIPPLE_PATTERN) for the primitive being queried.
D3DPRIM_RASTER_SUBPIXEL
    The device performs subpixel placement of z, color, and texture data, rather than working with the nearest integer pixel coordinate. This helps avoid bleed-through due to z imprecision, and jitter of color and texture values for pixels. Note that there is no corresponding state that can be enabled and disabled; the device either performs subpixel placement or it doesn't, and this bit is present only so that the Direct3D client has a better idea of what the rendering quality will be.
D3DPRIM_RASTER_ZTEST
    The device can perform z test operations. This effectively renders a primitive and indicates whether any z pixels would have been rendered.
zCmpCaps
    Specifies the z-buffer comparison functions that the driver can perform. One or more of the following capabilities can be specified for a device:
D3DCMP_NEVER
    Always fail the z test.
D3DCMP_LESS
    Pass the z test if the new z is less than the current z.
D3DCMP_EQUAL
    Pass the z test if the new z equals the current z.
D3DCMP_LEQUAL
    Pass the z test if the new z is less than or equal to the current z.
D3DCMP_GREATER
    Pass the z test if the new z is greater than the current z.
D3DCMP_NOTEQUAL
    Pass the z test if the new z does not equal the current z.
D3DCMP_GEQUAL
    Pass the z test if the new z is greater than or equal to the current z.
D3DCMP_ALWAYS
    Always pass the z test.
sourceBlendCaps
    Specifies source blending capabilities. One or more of the following capabilities can be specified for a device:
D3DPRIM_BLEND_ZERO
    Blend factor is (0, 0, 0, 0).
D3DPRIM_BLEND_ONE
    Blendfactoris(1, 1, 1, 1).
D3DPRIM_BLEND_DST_COLOR
    Blend factor is (Rd, Gd, Bd, Ad).
D3DPRIM_BLEND_INV_DST_COLOR
    Blend factor is (1-Rd, 1-Gd, 1-Bd, 1-Ad).
D3DPRIM_BLEND_SRC_ALPHA
    Blend factor is (As, As, As, As).
D3DPRIM_BLEND_INV_SRC_ALPHA
    Blend factor is (1-As, 1-As, 1-As, 1-As).
D3DPRIM_BLEND_DST_ALPHA
    Blend factor is (Ad, Ad, Ad, Ad).

APPENDIX A-continued

Copyright in the following material is retained by Microsoft Corporation of Redmond, Washington.

D3DPRIM_BLEND_INV_DST_ALPHA
    Blend factor is (1-Ad, 1-Ad, 1-Ad, 1-Ad).
D3DPRIM_BLEND_SRC_ALPHA_SAT
Blend factor is (f, f, f, 1); f = min(As, 1-Ad).
D3DPRIM_BLEND_BOTH_SRC_ALPHA
    Source blend factor is (As, As, As, As) and destination blend factor is (1-As, 1-As, 1-As, 1-As); the destination blend selection is overridden.
D3DPRIM_BLEND_BOTH_INV_SRC_ALPHA
    Source blend factor is (1-As, 1-As, 1-As, 1-As) and destination blend factor is (As, As, As, As); the destination blend selection is overridden.
destBlendCaps
    Specifies destination blending capabilities. One or more of the following capabilities can be specified for a device:
D3DPRIM_BLEND_ZERO
    Blend factor is (0, 0, 0, 0).
D3DPRIM_BLEND_ONE
    Blend factor is (1, 1, 1, 1).
D3DPRIM_BLEND_SRC_COLOR
    Blend factor is (Rs, Gs, Bs, As).
D3DPRIM_BLEND_INV_SRC_COLOR
    Blend factor is (1-Rs, 1-Gs, 1-Bs, 1-As).
D3DPRIM_BLEND_SRC_ALPHA
    Blend factor is (As, As, As, As).
D3DPRIM_BLEND_INV_SRC_ALPHA
    Blend factor is (1-As, 1-As, 1-As, 1-As).
D3DPRIM_BLEND_DST_ALPHA
    Blend factor is (Ad, Ad, Ad, Ad).
D3DPRIM_BLEND_INV_DST_ALPHA
    Blend factor is (1-Ad, 1-Ad, 1-Ad, 1-Ad).
alphaCmpCaps
    Specifies the alpha-test comparison functions that the driver can perform. One or more of the following capabilities can be specified for a device:
D3DCMP_NEVER
    Always fail the alpha test.
D3DCMP_LESS
    Pass the alpha test if the new alpha is less than the current alpha.
D3DCMP_EQUAL
    Pass the alpha test if the new alpha equals the current alpha.
D3DCMP_LEQUAL
    Pass the alpha test if the new alpha is less than or equal to the current alpha.
D3DCMP_GREATER
    Pass the alpha test if the new alpha is greater than the current alpha.
D3DCMP_NOTEQUAL
    Pass the alpha test if the new alpha does not equal the current alpha.
D3DCMP_GEQUAL
    Pass the alpha test if the new alpha is greater than or equal to the current alpha.
D3DCMP_ALWAYS
    Always pass the alpha test.
shadeCaps
    Specifies the shading operations that the device can perform. It is assumed, in general, that if a device supports a given command (such as D3DOP_TRIANGLE_LIST) at all, it supports the D3DSHADE_FLAT mode; this flag specifies whether the driver can also support D3DSHADE_GOURAUD, and whether alpha color components are supported for each of the three color generation modes. When alpha components are not supported in a given mode, the alpha value of colors generated in that mode are implicitly 255, the maximum possible alpha (that is, the alpha component is at full intensity). One or more of the following capabilities can be specified for a device:
D3DPRIM_SHADE_GOURAUD
    Device is capable of performing smooth shading (the D3DSHADE_GOURAUD state for the D3DSHADEMODE enumerated type.)
D3DPRIM_SHADE_WHITE
    Device is capable of performing smooth shading while interpolating a single white channel (the D3DSHADE_GOURAUD_WHITE state for the D3DSHADEMODE enumerated type)
D3DPRIM_FLAT_ALPHA
    Device is capable of supporting an alpha component for flat shading (the D3DSHADE_FLAT state for the D3DSHADEMODE enumerated type). In this mode, the alpha color component for a primitive is provided as part of the color for the last vertex of the primitive.
D3DPRIM_GOURAUD_ALPHA
    Device is capable of supporting an alpha component for flat shading (the D3DSHADE_FLAT state for the D3DSHADEMODE enumerated type). In

APPENDIX A-continued

Copyright in the following material is retained by Microsoft Corporation of Redmond, Washington.

this mode, the alpha color component for a primitive is provided at vertices and interpolated along with the other color components.

D3DPRIM_NORMAL_FOG
: Device is capable of supporting normal fog (an additional color that can be blended into each pixel's color with clamping).

D3DPRIM_CONSTANT_FOG
: Device is capable of supporting constant fog (an additional color that can be added into each pixel's color with clamping).

textureCaps
: Specifies miscellaneous texture-mapping capabilities. This member can be a combination of the following values:

D3DPRIM_TEX_PERSPECTIVE
: Perspective correction is supported.

D3DPRIM_TEX_POW2
: All non-mipmapped textures must have widths and heights specified as powers of two if this flag is set. (Note that all mipmapped textures must always have power-of-two dimensions.)

D3DPRIM_TEX_ALPHA
: RGBA textures are supported in the D3DTEX_DECAL and D3DTEX_MODULATE texture filtering modes. If this capability is not set, then only RGB textures are supported in those modes. Regardless of the setting of this flag, alpha must always be supported in D3DTEX_DECAL_MASK, D3DTEX_DECAL_ALPHA, and D3DTEX_MODULATE_ALPHA filtering modes whenever those filtering modes are available.

D3DPRIM_TEX_TRANSPARENCY
: Texture transparency is supported. (Only those texels that are not the current transparent color are drawn.)

D3DPRIM_TEX_BORDER
: Texture mapping along borders is supported.

D3DPRIM_TEX_SQUARE_ONLY
: All textures must be square.

textureFilterCaps
: Specifies texture-mapping capabilities. This member can be a combination of the following values:

D3DPRIM_TEX_NEAREST
: The texel with coordinates nearest to the desired pixel value is used. This applies to both zooming in and zooming out. If either zooming in or zooming out is supported, then both must be supported.

D3DPRIM_TEX_LINEAR
: A weighted average of a 2-by-2 area of texels surrounding the desired pixel is used. This applies to both zooming in and zooming out. If either zooming in or zooming out is supported, then both must be supported.

D3DPRIM_TEX_MIP_NEAREST
: Similar to D3DPRIM_TEX_NEAREST, but uses the appropriate mipmap for texel selection.

D3DPRIM_TEX_MIP_LINEAR
: Similar to D3DPRIM_TEX_LINEAR, but uses the appropriate mipmap for texel selection.

D3DPRIM_TEX_LINEAR_MIP_NEAREST
: Similar to D3DPRIM_TEX_MIP_NEAREST, but interpolates between the two nearest mipmaps.

D3DPRIM_TEX_LINEAR_MIP_LINEAR
: Similar to D3DPRIM_TEX_MIP_LINEAR, but interpolates between the two nearest mipmaps.

textureBlendCaps
: Specifies texture-blending capabilities. See the D3DSTATE_TEX_MAP_BLEND state in the D3DRENDERSTATETYPE enumerated type for discussions of the various texture-blending modes. This member can be a combination of the following values:

D3DPRIM_TEX_DECAL
: Decal texture-mapping mode (D3DTEX_DECAL) is supported.

D3DPRIM_TEX_MODULATE
: Modulate texture-mapping mode (D3DTEX_MODULATE) is supported.

D3DPRIM_TEX_DECAL_ALPHA
: Decal-alpha texture-mapping mode (D3DTEX_DECAL_ALPHA) is supported.

D3DPRIM_TEX_MODULATE_ALPHA
: Modulate-alpha texture-mapping mode (D3DTEX_MODULATE_ALPHA) is supported.

D3DPRIM_TEX_DECAL_MASK
: Decal-mask texture-mapping mode (D3DTEX_DECAL_MASK) is supported.

stippleWidth and stippleHeight
: Specifies the maximum width and height of the supported stipple (up to 32-by-32).

APPENDIX A-continued

Copyright in the following material is retained by Microsoft Corporation of Redmond, Washington.

Input Device Capabilities (Example of a Joystick)
```
typedef struct {
    WORD wMid;        \\ manufacturer identifier
    WORD wPid;        \\ product identifier
    CHAR szPname[MAXPNAMELEN]; \\ see below
    UINT wXmin;       \\ min. x-coordinate
    UINT wXmax;       max. x-coordinate
    UINT wYmin;       \\ min. y-coordinate
    UINT wYmax;       \\ max. y-coordinate
    UINT wZmin;       \\ min. z-coordinate
    UINT wZmax;       \\ max. z-coordinate
    UINT wNumButtons; \\ no. of joystick buttons
    UINT wPeriodMin;  see below
    UINT wPeriodMax;  see below
\\ The following members are not in previous versions of Windows.
    UINT wRmin;       \\ see below
    UINT wRmax;       \\ see below
    UINT wUmin;       \\ see below
    UINT wUmax;       \\ see below
    UINT wVmin;       \\ see below
    UINT wVmax;       \\ see below
    UINT wCaps;       \\ see below
    UINT wMaxAxes;    \\ see below
    UINT wNumAxes;    \\ see below
    UINT wMaxButtons; \\ see below
    CHAR szRegKey[MAXPNAMELEN]; \\ see below
    CHAR szOEMVxD[MAXOEMVXD]; \\ see below
} JOYCAPS;
```
Contains information about the joystick capabilities.
szPname
    Null-terminated string containing the joystick product name.
wPeriodMin
    Smallest polling frequency supported when an application has captured a joystick.
wPeriodMax
    Largest polling frequency supported an application has captured a joystick.
wRmin and wRmax
    Minimum and maximum rudder values. The rudder is a fourth axis of movement.
wUmin and wUmax
    Minimum and maximum u-coordinate (fifth axis) values.
wVmin and wVmax
    Minimum and maximum v-coordinate (sixth axis) values.
wCaps
    Joystick capabilities The following flags define individual capabilities that a joystick might have:
JOYCAPS_HASPOV
    Joystick has point-of-view information.
JOYCAPS_HASR
    Joystick has rudder (fourth axis) information.
JOYCAPS_HASU
    Joystick has u-coordinate (fifth axis) information.
JOYCAPS_HASV
    Joystick has v-coordinate (sixth axis) information.
JOYCAPS_HASZ
    Joystick has z-coordinate information.
JOYCAPS_POV4DIR
    Joystick point-of-view supports discrete values (centered, forward, backward, left, and right).
JOYCAPS_POVCTS
    Joystick point-of-view supports continuous degree bearings.
wMaxAxes
    Maximum number of axes supported by the joystick.
wNumAxes
    Number of axes currently in use by the joystick.
wMaxButtons
    Maximum number of buttons supported by the joystick.
szRegKey
    Null-terminated string containing the registry key for the joystick.
szOEMVxD
Null-terminated string identifying the joystick driver OEM.
Capabilities Structure for Player Device Object
```
typedef struct {
    DWORD   dwSize;
    DWORD   dwFlags;
    DWORD   dwMaxBufferSize;
```

APPENDIX A-continued

Copyright in the following material is retained by Microsoft Corporation of Redmond, Washington.

```
    DWORD    dwMaxQueueSize;
    DWORD    dwMaxPlayers;
    DWORD    dwHundredBaud;
    DWORD    dwLatency;
} DPCAPS
```
Contains the capabilities of a DirectPlay object after a call to the
IDirectPlay::GetCaps function. This structure is read-only.
dwSize
    Size, in bytes, of this structure. Must be initialized before the structure is used.
dwFlags
DPCAPS_GUARANTEE
    Supports verification of received messages. Retransmits message, if necessary.
DPCAPS_NAMESERVER
    Computer represented by calling application is the name server.
DPCAPS_NAMESERVICE
    A name server is supported.
dwMaxBufferSize
    Maximum buffer size for this DirectPlay object.
dwMaxQueueSize
    Maximum queue size for this DirectPlay object.
dwMaxPlayers
    Maximum number of players supported in a session.
dwHundredBaud
    Baud rate in multiples of one hundred. For example, the value 24 specifies 2400 baud.
dwLatency
    Latency estimate, in milliseconds, by service provider. If this value is zero, DirectPlay cannot provide an estimate. Accuracy for some service providers rests on application-to-application testing, taking into consideration the average message size.

We claim:

1. In a media device application programming interface implemented in a computer for allowing application programs executing in a host CPU in the computer to access a media device or software emulators executing in the host CPU in a computer, a method for optimizing an API request from an application program, the method comprising:

querying the media device for available hardware capabilities;

querying the software emulators for available software emulator capabilities;

storing the available hardware device and software emulator capabilities;

receiving an API request from an application program executing in the host CPU in the computer;

identifying a requested capability required to process the API request;

determining whether the requested capability corresponds to one of the available hardware capabilities, and if so, instructing the media device to process the API request; and determining whether the requested capability corresponds to one of the available software emulator capabilities when the hardware capabilities are insufficient to process the API request, and if so, instructing the corresponding software emulator to process the API request; and if neither a hardware nor a software capability is available to process the API request, returning an error to the application program.

2. The method of claim 1 further including:

finding the intersection between the hardware and software capabilities;

storing the intersection of the hardware and software capabilities.

3. The method of claim 1 wherein the media device is a display controller, the API request is a bit block transfer function call;

wherein the step of querying the media device includes querying a device driver of the display controller for bit block transfer capabilities of the display controller; and wherein the step of instructing the media device to process the API request comprises instructing the display controller to perform a bit block transfer of a source image in video memory to a destination image in video memory.

4. The method of claim 1 wherein the media device is a display controller, and wherein the step of querying the media device includes querying a device driver of the display controller for capabilities of the display controller to support overlays, to support color space conversion, and to support mirroring, rotation, shrinking or stretching of an image stored in video memory;

storing a list of the capabilities of the display controller; and in response to an API request that requires support for overlays, color space conversions, or mirroring, rotation, shrinking, or stretching of an image, determining whether the required support for the API request is listed in the list of capabilities, and if so, carrying out the API request using only memory and processing resources of the display controller.

5. The method of claim 1 wherein the media device is a display controller and the media device API includes a display controller API;

wherein the display controller API includes a create surface function to create instances of surface objects representing regions of pixel memory in either main memory of the computer or video memory, a create palette function to create instances of palette objects representing color tables, a function to return capabilities of a specified instance of a surface object, and a function to return the capabilities of a specified instance of a palette object; and wherein the method further includes:

when an application program invokes the function to return the capabilities of a specified instance of a surface object, returning the capabilities of the specified surface object, including a type of surface that the surface object represents and whether the surface resides in the video memory or the main memory on the computer.

6. The method of claim 1 wherein the media device is a sound device for playing digital sound data and the step of querying the media device includes querying a device driver of the sound device for sound format or formats supported by the sound device, sound mixing capabilities of the sound device, and available sound device memory.

7. The method of claim 6 further including:

storing a list of sound mixing capabilities supported by the sound device;

in response to an API request from an application program that requires mixing of sound data, determining whether a capability required to mix the sound data is in the list of sound mixing capabilities, and if so, optimizing the API request by instructing the sound device to mix the sound data instead of the computer.

8. The method of claim 1 wherein the media device is a sound device for playing digital sound data and the media device API includes a sound device API;

wherein the sound device API includes a create sound buffer function to create instances of sound buffer objects representing regions of audio memory, and a function to return capabilities of a specified instance of a sound buffer object; and when an application program invokes the function to return the capabilities of a specified instance of a sound buffer object, returning the capabilities of the specified sound buffer object, including a type of sound buffer that the sound buffer object represents and whether the sound buffer resides in memory on the sound device or in main memory of the computer.

9. The method of claim 1 wherein the media device is a 3D accelerator and the step of querying the media device includes querying a device driver of the 3D accelerator for capabilities of the 3D accelerator to perform lighting, shading, or transformation operations;

and in response to an API request that requires 3D accelerator capabilities, determining whether the 3D accelerator has the required capabilities, and if so, instructing the 3D accelerator to carry out the API request.

10. The method of claim 1 further including:

reporting a capability of the media device that requires software preparation; and in response to receiving an API request that requires both software preparation and capabilities of the media device, instructing a software emulator to prepare the API request, and instructing the media device to complete the API request.

11. In a display device application programming interface (API) implemented in a multitasking computer for allowing application programs executing in a host CPU in the computer to access a display controller coupled to the computer or software emulators executing in the host CPU in a computer, a method for optimizing an API request from an application program, the method comprising:

querying the display controller for available hardware capabilities;

querying the software emulators for available software emulator capabilities;

storing the available display controller and software emulator capabilities, including free and total video memory and two or more of the following capabilities: capabilities to perform bit block transfers, to overlay an image unto another image, to support pixel formats, to perform color space conversion, and to perform mirroring, rotation, stretching or shrinking of an image;

receiving an API request from the application program that requires one or more of the capabilities of the display controller or the software emulators;

identifying a requested capability required to process the API request;

determining whether the requested capability corresponds to one of the available display controller capabilities, and if so, instructing the display controller to process the API request; and determining whether the requested capability corresponds to one of the software emulator capabilities when the hardware capabilities are insufficient to process the API request, and if so, instructing the corresponding software emulator executing in the host CPU to process the API request; and if neither a hardware nor a software capability is available to process the API request, returning an error to the application program.

12. In a sound device application programming interface (API) implemented in a multitasking computer for allowing application programs executing in a host CPU of the computer to access a sound device coupled to the computer or software emulators executing in the host CPU of the computer for mixing digital sound data, a method for optimizing an API request from an application program, the method comprising:

querying the sound device for available hardware capabilities;

querying the software emulators for available software emulator capabilities;

storing the available sound device and software emulator capabilities, including free and total audio memory and capabilities to perform sound mixing operations;

receiving an API request from the application program that requires one or more of the capabilities of the sound device or the software emulators;

identifying a requested capability required to process the API request;

determining whether the requested capability corresponds to one of the available sound device capabilities, and if so, instructing the sound device to process the API request; and determining whether the requested capability corresponds to one of the software capabilities when the sound device capabilities are insufficient to process the API request, and if so, instructing the corresponding software emulator executing in the host CPU to process the API request; and if neither a sound device nor a software emulator capability is available to process the API request, returning an error to the application program.

13. A computer readable medium on which is stored an application programming interface (API) to be executed on a host CPU for optimizing an API request from an application program to be executed on the host CPU, said API comprising instructions, which when executed by the host CPU of a computer, perform the steps of:

querying the media device for available hardware capabilities;

querying the software emulators executing in the host CPU for available software emulator capabilities;

storing the available hardware device and software emulator capabilities;

receiving an API request from an application program executing in the host CPU of the computer;

identifying a requested capability required to process the API request;

determining whether the requested capability corresponds to one of the available hardware capabilities, and if so, instructing the media device to process the API request; and determining whether the requested capability corresponds to one of the software emulator capabilities when there are insufficient hardware capabilities to process the API request, and if so, instructing the corresponding software emulator executing in the host CPU to process the API request; and if neither a hardware nor a software capability is available to process the API request, returning an error to the application program.

* * * * *

UNITED STATES PATENT AND TRADEMARK OFFICE
CERTIFICATE OF CORRECTION

PATENT NO. : 6,044,408
DATED : March 28, 2000
INVENTOR(S) : Engstrom et al.

Page 1 of 1

It is certified that error appears in the above-identified patent and that said Letters Patent is hereby corrected as shown below:

<u>Column 48,</u>
Line 35, error reads "capabilities" should read -- capabilities; in response to the API request, determining whether the requested capability is in the intersection and if so, instructing the media device to process the API request --.

Signed and Sealed this

Eleventh Day of September, 2001

*Attest:*

*Attesting Officer*

NICHOLAS P. GODICI
*Acting Director of the United States Patent and Trademark Office*